United States Patent
Shibata

(10) Patent No.: US 11,501,522 B2
(45) Date of Patent: Nov. 15, 2022

(54) IMAGE RECOGNITION MODEL GENERATING DEVICE, IMAGE RECOGNITION MODEL GENERATING METHOD, AND IMAGE RECOGNITION MODEL GENERATING PROGRAM STORING MEDIUM

(71) Applicant: NEC CORPORATION, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 171 days.

(21) Appl. No.: 16/765,742

(22) PCT Filed: Dec. 3, 2018

(86) PCT No.: PCT/JP2018/044340
§ 371 (c)(1),
(2) Date: May 20, 2020

(87) PCT Pub. No.: WO2019/111840
PCT Pub. Date: Jun. 13, 2019

(65) Prior Publication Data
US 2020/0293813 A1 Sep. 17, 2020

(30) Foreign Application Priority Data
Dec. 6, 2017 (JP) .............................. JP2017-233935

(51) Int. Cl.
*G06V 10/75* (2022.01)
*G06K 9/62* (2022.01)
(Continued)

(52) U.S. Cl.
CPC ....... *G06V 10/7557* (2022.01); *G06K 9/6215* (2013.01); *G06N 3/04* (2013.01); *G06F 17/18* (2013.01)

(58) Field of Classification Search
CPC .. G06V 10/7557; G06V 10/82; G06V 10/454; G06V 20/52; G06V 10/44;
(Continued)

(56) References Cited

U.S. PATENT DOCUMENTS 9,767,540 B2 * 9/2017 Lin .......................... G06T 5/002
10,672,104 B2 * 6/2020 Urban ..................... G06T 5/002
(Continued)

FOREIGN PATENT DOCUMENTS

JP 2005-084824 A 3/2005
JP 2011-138314 A 7/2011
(Continued)

OTHER PUBLICATIONS

Richard Szeliski, "Computer Vision: Algorithms and Applications", Springer, 2010, p. 1-812.
(Continued)

*Primary Examiner* — Michael S Osinski
(74) *Attorney, Agent, or Firm* — Sughrue Mion, PLLC

(57) ABSTRACT

In order to improve the learning performance of a neural network model, this image recognition model generating device is provided with an input image patch determining unit, a similar patch searching unit, a pixel value generating unit, and a convolution processing unit. The input image patch determining unit determines an input image patch containing a border region in contact with the outside of a boundary line of an input image. The similar patch searching unit searches for a similar patch that is similar to the input image patch. The pixel value generating unit generates a pixel value complementing the border region, on the basis of the similar patch. The convolution processing unit performs a convolution process from the generated pixel value and pixel values of the input image.

14 Claims, 26 Drawing Sheets

(51) Int. Cl.
*G06N 3/04* (2006.01)
*G06F 17/18* (2006.01)

(58) Field of Classification Search
CPC ...... G06V 10/25; G06V 10/255; G06V 10/40;
G06V 10/462; G06V 10/751; G06V
10/50; G06V 10/759; G06V 10/758;
G06K 9/6215; G06K 9/6256; G06K
9/6267; G06K 9/6232; G06K 9/6274;
G06K 9/6273; G06N 3/04; G06N 3/0454;
G06N 3/08; G06N 3/0445; G06N 3/084;
G06F 17/18; G06T 7/00; G06T
2207/20081; G06T 2207/20084; G06T
5/002; G06T 7/11; G06T 3/4053; G06T
2207/20021; G06T 5/003; G06T 5/005;
G06T 5/20; G06T 5/50; G06T 7/194;
G06T 11/60
See application file for complete search history.

(56) References Cited

U.S. PATENT DOCUMENTS

| | | | |
|---|---|---|---|
| 10,692,002 B1* | 6/2020 | Kim | G06N 3/08 |
| 10,692,471 B2* | 6/2020 | Kim | G09G 5/373 |
| 10,769,582 B2* | 9/2020 | Williams | G06V 10/40 |
| 10,776,982 B2* | 9/2020 | Risser | G06T 11/001 |
| 11,341,375 B2* | 5/2022 | Choi | G06V 10/454 |
| 2008/0310744 A1* | 12/2008 | Mim | H04N 19/11 |
| | | | 382/238 |
| 2012/0237082 A1* | 9/2012 | Sengupta | G06V 10/267 |
| | | | 382/218 |
| 2012/0321175 A1* | 12/2012 | Hedau | G06K 9/6231 |
| | | | 382/224 |
| 2014/0355899 A1* | 12/2014 | Jin | G06T 5/005 |
| | | | 382/254 |
| 2014/0368509 A1* | 12/2014 | Lin | G06T 5/002 |
| | | | 345/428 |
| 2015/0071545 A1* | 3/2015 | Yang | G06T 5/003 |
| | | | 382/190 |
| 2015/0139557 A1* | 5/2015 | Lin | G06K 9/6276 |
| | | | 382/220 |
| 2015/0302566 A1* | 10/2015 | Shibata | G06T 5/001 |
| | | | 382/275 |
| 2016/0063677 A1* | 3/2016 | Deamo | G06K 9/6215 |
| | | | 382/199 |
| 2016/0180507 A1* | 6/2016 | Paik | H04N 5/3572 |
| | | | 382/275 |
| 2017/0061625 A1* | 3/2017 | Estrada | G06T 7/90 |
| 2018/0025256 A1* | 1/2018 | Bai | G06N 3/0454 |
| | | | 382/229 |
| 2018/0101942 A1* | 4/2018 | Carr | G06T 7/337 |
| 2018/0165798 A1* | 6/2018 | Lin | G06N 3/084 |
| 2018/0365579 A1* | 12/2018 | Wan | G06F 16/3334 |
| 2019/0042850 A1* | 2/2019 | Jones | G06V 10/454 |
| 2019/0080456 A1* | 3/2019 | Song | G06T 7/11 |
| 2019/0164258 A1* | 5/2019 | Takahama | G06T 5/20 |
| 2019/0355126 A1* | 11/2019 | Sun | G06V 10/451 |
| 2020/0014937 A1* | 1/2020 | Grangetto | G06V 10/469 |
| 2020/0074178 A1* | 3/2020 | Guo | G06K 9/6271 |
| 2020/0143193 A1* | 5/2020 | Najibikohnehshahri | G06V 20/10 |
| 2020/0151434 A1* | 5/2020 | Lai | G06V 40/172 |
| 2020/0151860 A1* | 5/2020 | Safdarnejad | G06V 40/168 |
| 2020/0327557 A1* | 10/2020 | Akgul | G06V 20/52 |
| 2021/0390673 A1* | 12/2021 | Ban | G06T 7/194 |

FOREIGN PATENT DOCUMENTS

| | | |
|---|---|---|
| JP | 2014-215604 A | 11/2014 |
| JP | 2017-004350 A | 1/2017 |
| JP | 2017-112571 A | 6/2017 |

OTHER PUBLICATIONS

International Search Report for PCT/JP2018/044340 dated Jan. 8, 2019 [PCT/ISA/210].

Written Opinion for PCT/JP2018/044340 dated Jan. 8, 2019 [PCT/ISA/237].

* cited by examiner

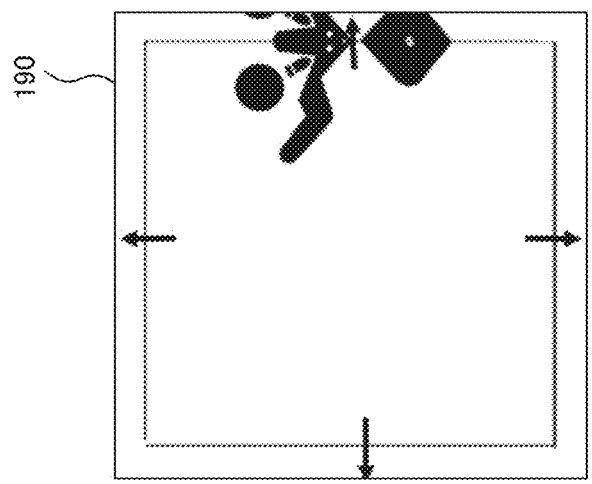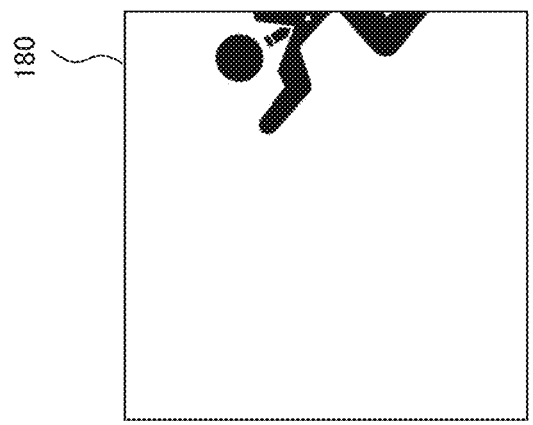
Fig. 5

Fig. 9
| ID | SIMILAR PATCH CANDIDATE | DOMAIN | ... |
|---|---|---|---|
| 0 | 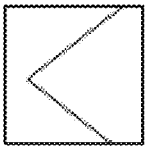 | Tree | ... |
| 1 | 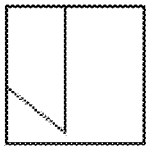 | Tree | ... |
| 2 | 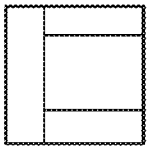 | Tree | ... |
1061

IMAGE RECOGNITION MODEL GENERATING DEVICE, IMAGE RECOGNITION MODEL GENERATING METHOD, AND IMAGE RECOGNITION MODEL GENERATING PROGRAM STORING MEDIUM

CROSS REFERENCE TO RELATED APPLICATIONS

This application is a National Stage of International Application No. PCT/JP2018/044340 filed Dec. 3, 2018, claiming priority based on Japanese Patent Application No. 2017-233935 filed Dec. 6, 2017.

TECHNICAL FIELD

The present invention relates to a technique related to deep learning to be used for image recognition and the like.

BACKGROUND ART

Recently, various image processing and image recognition methods have been developed. Particularly in recent years, a method called deep learning has become widespread. The deep learning is known as a methodology of machine learning using a neural network. One of the deep learning is convolutional neural networks. In the convolutional neural networks, there is a known issue that a size of an output image becomes smaller than a size of an input image due to convolution processing.

PTL 1 discloses one example of a method of complementing a pixel value of a border of an image with a value of zero and performing learning of the convolutional neural networks by using the complemented image. NPL 1 discloses a method of complementing a pixel value of a border of an image by folding the image on four sides.

CITATION LIST

Patent Literature

[PTL 1] Japanese Unexamined Patent Application Publication No. 2017-004350

Non Patent Literature

[NPL 1] R. Szeliski, "Computer Vision: Algorithms and Applications", Springer, 2010, p. 114

SUMMARY OF INVENTION

Technical Problem

In the techniques disclosed in PTL 1 and NPL 1, when the complemented image is used for learning of a neural network model, learning performance of the model may be degraded. The present invention has been devised in order to solve the issue. In other words, a main object of the present invention is to provide a technique for improving learning performance of a neural network model.

Solution to Problem

An image recognition model generating device according to one example embodiment of the present invention includes, an input image patch determining unit for determining, based on an input image for generating a convolutional neural network that recognizes a predetermined target in an image, an input image patch containing a border region adjacent to an outside of a boundary line of the input image, a similar patch searching unit for searching for a similar patch being similar to the input image patch, a pixel value generating unit for generating, based on the similar patch, a pixel value that complements the border region, and a convolution processing unit for performing convolution processing from a generated pixel value and a pixel value of the input image.

An image recognition model generating method according to one example embodiment of the present invention includes, by a computer, determining, based on an input image for generating a convolutional neural network that recognizes a predetermined target in an image, an input image patch containing a border region adjacent to an outside of a boundary line of the input image, searching for a similar patch being similar to the input image patch, generating, based on the similar patch, a pixel value that complements the border region, and performing convolution processing from a generated pixel value of the border region and a pixel value of the input image.

An image recognition model generating program storing medium according to one example embodiment of the present invention stores a computer program that causes a computer to execute, processing of determining, based on an input image for generating a convolutional neural network that recognizes a predetermined target in an image, an input image patch containing a border region adjacent to an outside of a boundary line of the input image, and searching for a similar patch being similar to the input image patch, processing of generating, based on the similar patch, a pixel value that complements the border region, and processing of performing convolution processing from a generated pixel value of the border region and a pixel value of the input image.

An image generating device according to one example embodiment of the present invention includes, a similar patch searching unit for searching for a similar patch being similar to an input image patch containing a border region adjacent to an outside of an input image, a pixel value generating unit for generating, based on the similar patch, a pixel value that complements the border region, and an image output unit for generating an image in which a pixel value of the border region is complemented from a generated pixel value of the border region and a pixel value of the input image, and outputting the image.

An image generating method according to one example embodiment of the present invention includes, by a computer, determining an input image patch containing a border region adjacent to an outside of a boundary line of an input image, searching for a similar patch being similar to the input image patch, generating, based on the similar patch, a pixel value that complements the border region, and outputting an image in which a pixel value of the border region is complemented from a generated pixel value of the border region and a pixel value of the input image.

An image generating program storing medium according to one example embodiment of the present invention stores a computer program that causes a computer to execute, processing of determining an input image patch containing a border region adjacent to an outside of a boundary line of an input image, and searching for a similar patch being similar to the input image patch, processing of generating, based on the similar patch, a pixel value that complements the border region included in the input image patch, and processing of outputting an image in which a pixel value of the border region of the input image is complemented from a generated pixel value of the border region and a pixel value of the input image.

Advantageous Effects of Invention

The present invention provides a technique for improving learning performance of a neural network model.

BRIEF DESCRIPTION OF DRAWINGS

FIG. 5 is a diagram illustrating an issue of the method of extending the image illustrated in FIG. 4.

FIG. 9 is a diagram illustrating one example of information stored in a similar patch database.

EXAMPLE EMBODIMENT

Figure 1:
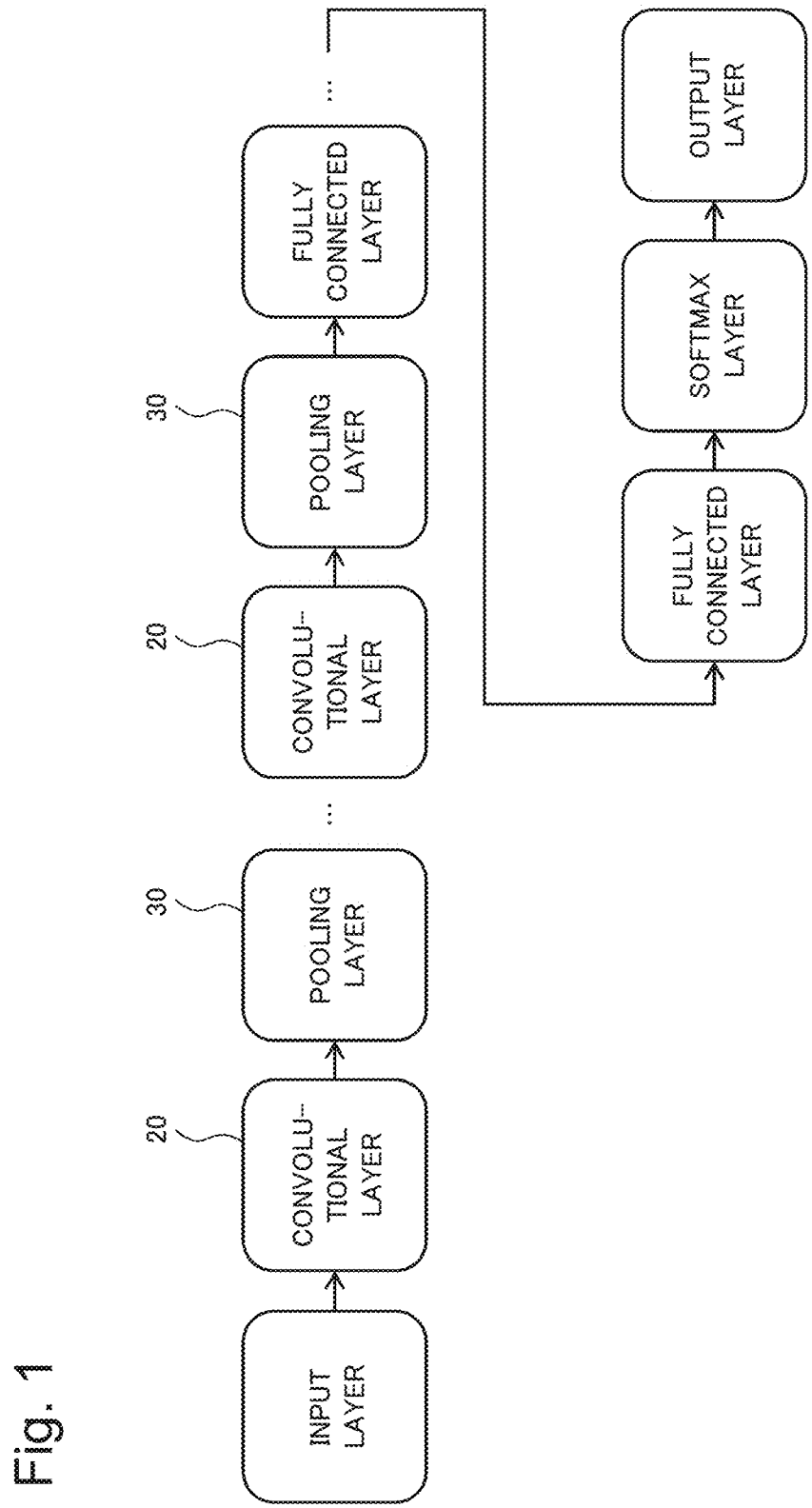
FIG. 1 is a diagram illustrating one example of processing in a convolutional neural network.

Example embodiments of the present invention will be described below with reference to the drawings. The same reference sign is given to a similar component in all of the drawings, and overlapping description will be omitted. Further, unless specifically described, each block illustrated in the drawings represents a functional unit, but not a hardware unit.

In order to facilitate understanding, before describing the example embodiments of the present invention, an issue to be solved by the present invention will be described with a specific example.

First, a convolutional neural network will be described with reference to FIG. 1. FIG. 1 is a diagram illustrating one example of the convolutional neural network. The convolutional neural network includes a convolutional layer 20 and a pooling layer 30. The convolutional layer 20 performs convolution of a local region in an image. The pooling layer 30 performs pooling being processing of reducing an image while leaving a feature of the image.

Figure 2:
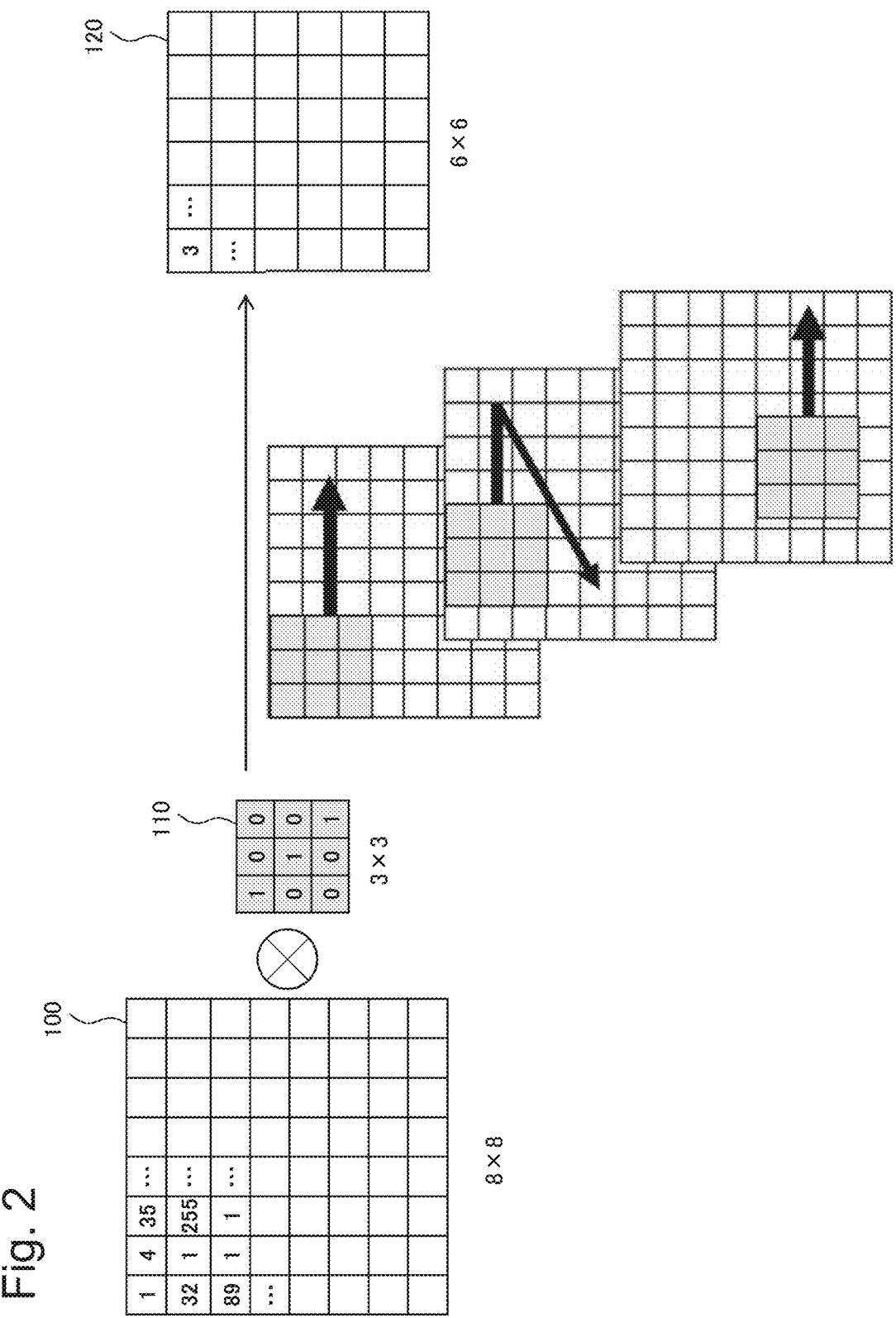
FIG. 2 is a diagram illustrating one example of processing in a convolutional layer.

Herein, the processing of the convolutional layer 20 illustrated in FIG. 1 will be described with reference to FIG. 2. FIG. 2 is a diagram illustrating one example of the processing in the convolutional layer 20. In the convolutional layer 20, a filter 110 is superimposed on an image before convolution 100, a product of pixel values of overlapping pixels of the image before convolution 100 and the filter 110 is acquired, and all the acquired products are added. The value acquired by the addition becomes a pixel value of the associated pixel of the image after convolution 120. By repeating such processing while raster-scanning the image before convolution 100 with the filter 110, pixel values of the pixels in the image after convolution 120 are calculated. The pixel value of the image is a value according to a feature of the image.

The size of the image after convolution 120 by the processing of the convolutional layer 20 as described above is smaller than the input image (image before convolution 100). For this reason, a method may be employed in such a way that the size of the image acquired by the processing of the convolutional layer 20 becomes the same as the size of the input image. In this case, the image is extended before or after the convolution processing. When the image is extended, a pixel value of a pixel in the extended part, namely, in a border region (around the border) adjacent to the outside of the boundary line of the image (original image) before the extension needs to be calculated (complemented) in some way. As one example of a method of complementing a pixel value of a border region in an image, zero padding and a method of folding an image on four sides and setting a pixel value are known.

Figure 3:
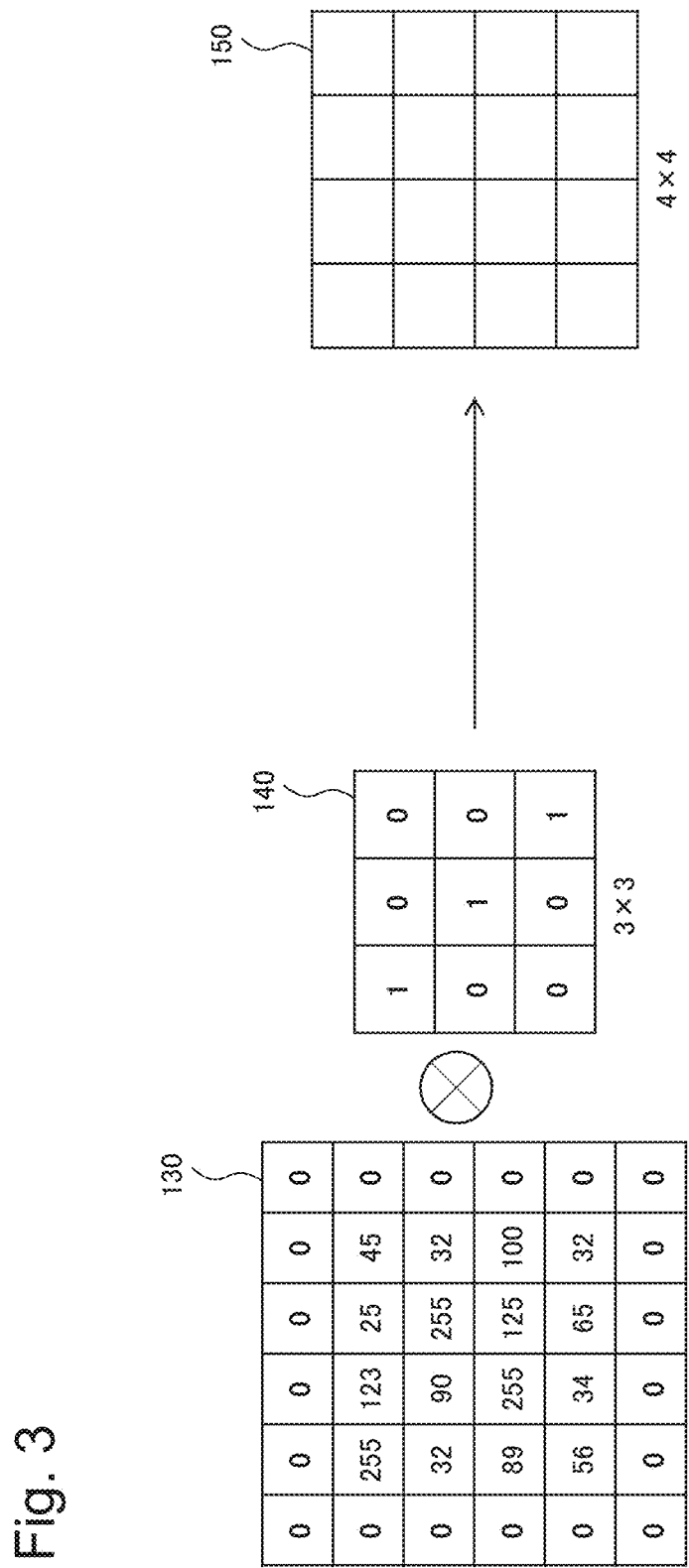
FIG. 3 is a diagram illustrating one example of processing of zero padding.

The zero padding will be described with reference to FIG. 3. FIG. 3 is a diagram illustrating one example of the zero padding. An image before convolution 130 illustrated in FIG. 3 is one example of a zero-padded image. The image before convolution 130 is an image in which the image is extended by setting pixels in such a way as to surround the image (input image) having a size where pixels are arranged in a 4×4 array, and zero is set, as a pixel value, for the pixels in the extended part (i.e., border region). The processing of setting a pixel value to zero is referred to as the zero padding. The image before convolution 130 has a size in which pixels are arranged in a 6×6 array by the zero padding. A filter 140 illustrated in FIG. 3 is one example of the filter to be used for the convolution processing. In the example of FIG. 3, the size of the filter 140 is a size in which pixels are arranged in a 3×3 array. An image after convolution 150 illustrated in FIG. 3 is one example of an image acquired by the convolution processing by using the image before convolution 130 and the filter 140. The size of the image after convolution 150 is the same size (size in which the pixels arc arranged in a 4×4 array) as the original image (input image). Thus, the zero padding is used for maintaining the size of an image before and after the convolution processing.

Figure 4:
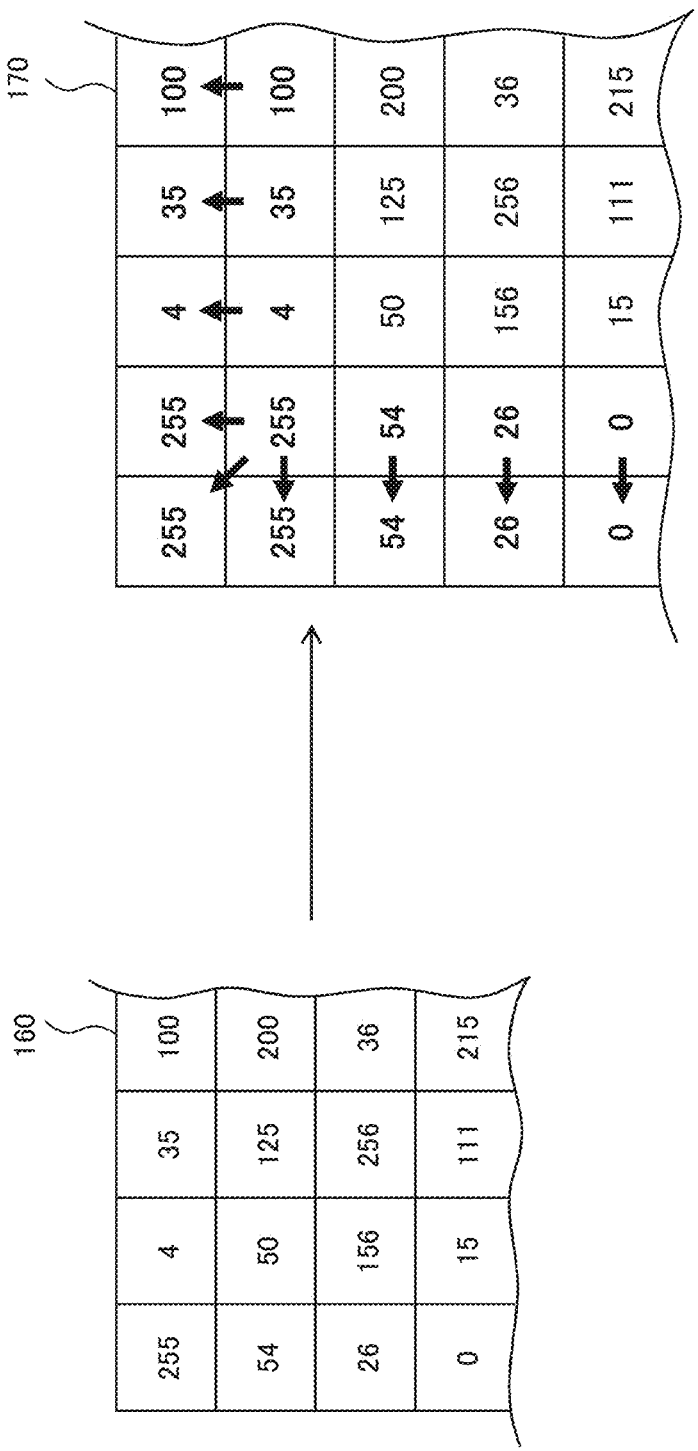
FIG. 4 is a diagram illustrating one example of a method of extending an image.

Next, a padding method of setting a pixel value by folding an image on four sides will be described with reference to FIG. 4. FIG. 4 is a diagram illustrating one example of the padding method. An image before padding 160 illustrated in FIG. 4 is an image before padding is performed. An image after padding 170 illustrated in FIG. 4 is an image after padding is performed. In the padding processing, first, an image is extended by setting pixels in such a way as to surround the image before padding 160. Then, the same pixel values as the pixel values (255, 4, 35, 100, ... ) of the pixels at the top row of the image before padding 160 arc set (complemented) to pixels of a border region (extended part) at the top of the extended image. Similarly, the same pixel values as the pixel values (255, 54, 26, 0, ... ) of the pixels at the leftmost column of the image before padding 160 are complemented to pixels of the border region on the left side of the extended image. The pixel values of the border regions on the right side and at the bottom of the extended image are similarly complemented. By such processing, the size of the image after the convolution processing is maintained at the size of the input image (image before padding 160).

An issue of the method using the above-described zero padding will be described. In the method using the zero padding, the pixel values of the border region of an extended image arc set to zero. For this reason, when the pixel value is a value depending on a luminance, the entire image becomes dark. As a result, an image having a different appearance from the input image is generated by the zero padding. The inventor of the present invention has found that the generation of an image having a different appearance from the input image due to the convolution processing is a cause of degrading learning performance of a convolutional neural network model. Next, an issue of the method of setting a pixel value by folding the image on four sides illustrated in FIG. 4 will be described with reference to FIG. 5. FIG. 5 is a diagram illustrating the issue of the method of setting a pixel value by folding the image on four sides. The method of setting a pixel value by folding the image on four sides has the issue that an image unintended by a user is generated. For example, an upper body of a person is reflected in an image before padding 180 illustrated in FIG. 5. It is assumed that the image before padding 180 is extended in four directions, and the pixels of the border region on the four sides of the extended image (image after padding) 190 arc complemented by pixel values depending on the pixel values of the pixels on the four sides of the image before padding 180. Herein, the image originally intended by a user after complementing is an image in which a portion of the lower body of the person is complemented. However, the image after padding 190 is an image in which the upper body of the person is folded around the waist. Alternatively, the image is as if the upper body of the person is stretched around the waist. These are unnatural images that arc far from the image originally intended by a user. The inventor has found that performing learning of a convolutional neural network model by using such an image is a cause of degrading the learning performance of the convolutional neural network model.

The present invention has been devised to solve the above-described issue.

First Example Embodiment

Figure 6:
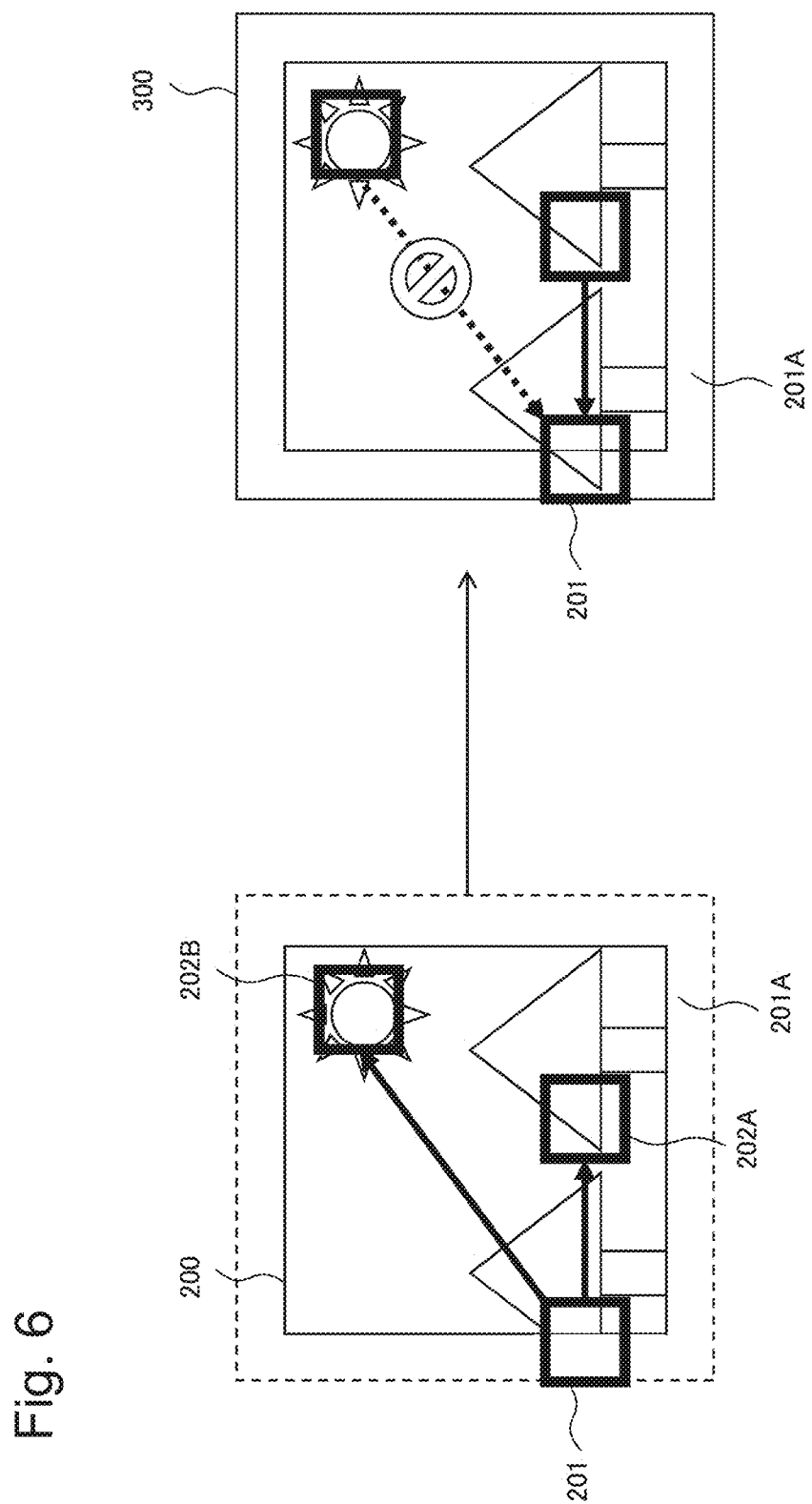
FIG. 6 is a diagram illustrating an overview of complementing processing to be performed in an image recognition model generating device according to a first example embodiment.

FIG. 6 is a diagram illustrating an overview of processing by an image recognition model generating device according to a first example embodiment of the present invention. The processing of the image recognition model generating device described below is an example for facilitating understanding of the image recognition model generating device according to the present invention. The image recognition model generating device according to the present invention is not limited to the following example.

An image before padding 200 illustrated in FIG. 6 is an image before padding is performed. The image before padding 200 illustrated in FIG. 6 is a landscape painting including two trees and the sun. Of the two trees, the left end of the branch of the left tree is not included in the image before padding 200. The entire tree on the right side is included in the image before padding 200.

An image after padding 300 illustrated in FIG. 6 is an image after padding is performed on pixel values of a border region 201A. Comparing the image before padding 200 with the image after padding 300 in FIG. 6, it can be seen that the border region of a portion included in an input image patch 201 in the entire circumference of the border region 201A surrounding the image before padding 200 is complemented in the image after padding 300.

Herein, the border region is defined by using FIG. 6. According to the first example embodiment, the border region of the image is a region adjacent to (extended to) the outside of the boundary line of the image before padding 200, and in which a pixel value is to be set. For example, a region surrounded by the boundary line (solid line) and a broken line of the image before padding 200 is the border region 201A. The region where padding is performed in the image after padding 300 is also the border region 201A. According to the first example embodiment, the region width of the border region 201A is one pixel, but is not limited thereto. The width of the border region may be expanded depending on the size of an image.

As illustrated in FIG. 6, the input image patch 201 includes a partial region of the image before padding 200 and the border region 201A. The image recognition model generating device according to the first example embodiment complements the pixel value of the border region included in the input image patch 201.

The image recognition model generating device according to the first example embodiment determines the input image patch 201 from the image before padding 200. Then, the image recognition model generating device searches for another region (hereinafter, referred to as a "similar patch") similar to the input image patch 201 from the same image before padding 200, for example.

FIG. 6 exemplifies a first similar patch candidate 202A and a second similar patch candidate 202B, which are candidates for the similar patch. Herein, as is clear from the diagram, what is similar to the input image patch 201 is not the second similar patch candidate 202B but the first similar patch candidate 202A. Therefore, the first similar patch candidate 202A is searched from the image before padding 200 as the similar patch. More precisely, the similar patch is selected from a plurality of similar patch candidates to be set, based on a degree of similarity between the partial region of the image before padding 200 included in the input image patch 201 and a related partial region in the similar patch candidates, as described later.

The image recognition model generating device according to the first example embodiment complements, based on the similar patch, a pixel value of the border region included in the input image patch 201. The image recognition model generating device according to the first example embodiment performs the similar processing over the entire circumference of the border region of the image before padding 200. As a result, the pixel values of the entire circumference of the border region of the image before padding 200 are complemented.

<Operation and Advantageous Effect>

As described above, the image recognition model generating device according to the first example embodiment determines the input image patch 201 including the border region of the image before padding 200. Then, the image recognition model generating device according to the first example embodiment searches for a similar patch tht is similar to the input image patch 201. Further, the image recognition model generating device according to the first example embodiment complements, based on the similar patch, a pixel value of the border region included in the input image patch 201. Accordingly, the image recognition model generating device according to the first example embodiment can avoid a situation where an unnatural image is generated by complementing the pixel value of the border region. The image recognition model generating device according to the first example embodiment uses an image acquired by correcting the pixel value of the border region as described above as an input image to be used for learning of a convolutional neural network model. Thus, learning performance of a neural network model is improved.

The image recognition model generating device according to the first example embodiment uses a "translational symmetry" between a statistical law of the similar patch and a statistical law of the input image patch 201. Herein, the "translational symmetry" will be described by use of a specific example. The image similar in appearance to the input image patch 201 is the first similar patch candidate 202A instead of the second similar patch candidate 202B illustrated in FIG. 6. A reason for this is that both the input image patch 201 and the first similar patch candidate 202A are considered to be tree images, but not the sun. Therefore, even when the left end of the branch related to the border region in the input image patch 201 is complemented by the image with left end of another tree included in the first similar patch candidate 202A, it can be said that the appearance of the image does not change significantly. At this time, it is said that the "translational symmetry coincides between the input image patch 201 and the first similar patch candidate 202A".

Hereinafter, a configuration of the image recognition model generating device according to the first example embodiment will be described in detail.

<Device Configuration>

Figure 7:
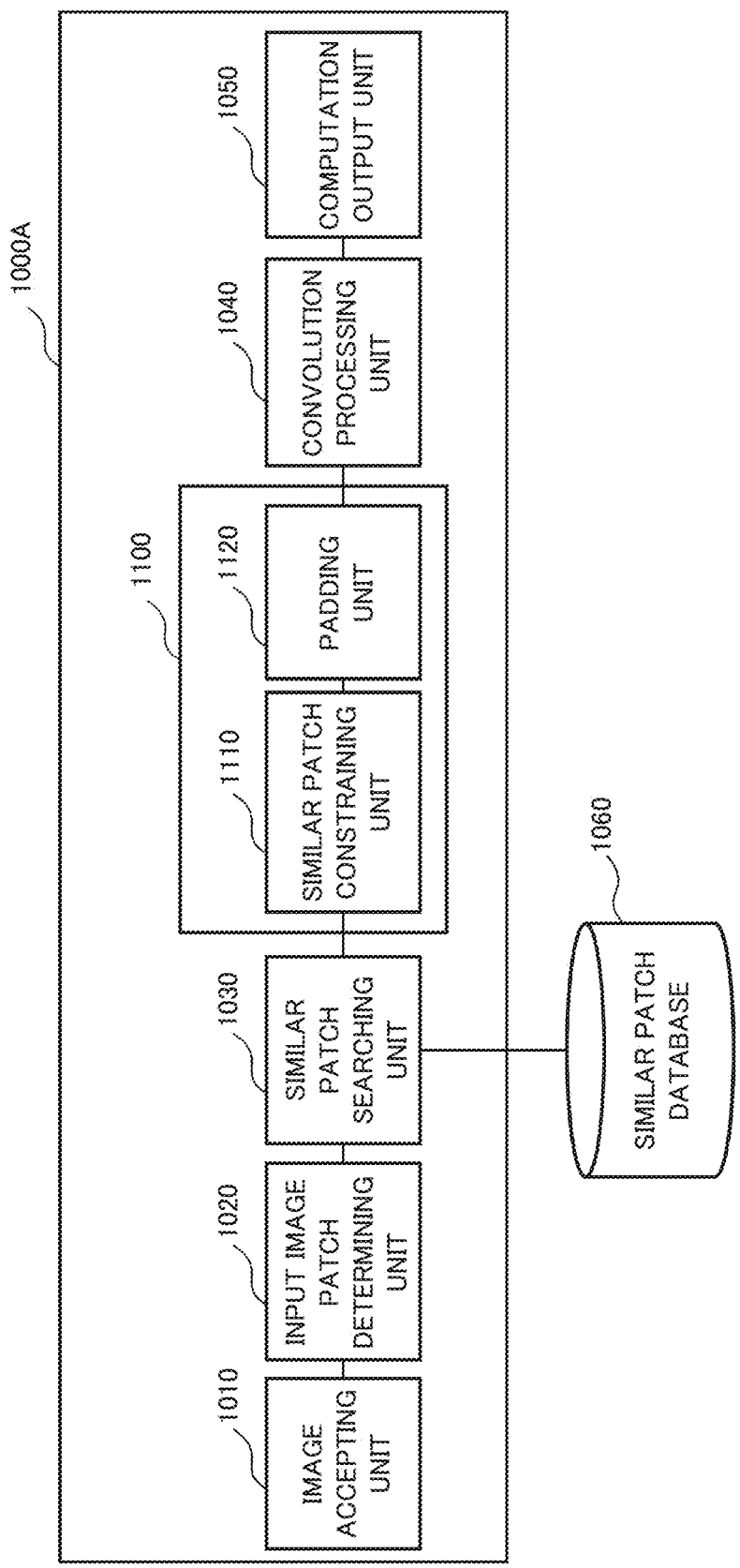
FIG. 7 is a block diagram illustrating a functional configuration of the image recognition model generating device according to the first example embodiment.

FIG. 7 is a block diagram illustrating a schematic configuration of an image recognition model generating device 1000A according to the first example embodiment.

The image recognition model generating device 1000A according to the first example embodiment includes an image accepting unit 1010, an input image patch determining unit 1020, a similar patch searching unit 1030, a pixel value generating unit 1100, a convolution processing unit 1040, and a computation output unit 1050. The image recognition model generating device 1000A is connected to a similar patch database 1060. Further, the pixel value generating unit 1100 includes a similar patch constraining unit 1110 and a padding unit 1120.

The image accepting unit 1010 accepts one or more images captured by a camera. The camera may be a visible light camera or a camera for imaging other wavelengths, for example an infrared camera or an ultraviolet camera. The image accepting unit 1010 may accept a measured value acquired by a sensor for measurement and the like, other than a camera. For example, the image accepting unit 1010 may accept a heat distribution image (thermography) or a distance image. Herein, an image accepted by the image accepting unit 1010 or an image based on a measured value is referred to as an input image.

The input image patch determining unit 1020 determines the input image patch 201 including a border region of the input image.

The similar patch database 1060 is a database that stores a similar patch candidate extracted from the input image.

The similar patch searching unit 1030 searches for a similar patch close to the input image patch 201 from a plurality of similar patch candidates to be stored in the similar patch database 1060.

The similar patch constraining unit 1110 generates a constraint term based on the searched similar patch, according to a preset method.

The padding unit 1120 generates a pixel value that complements the border region included in the input image patch 201, based on the generated constraint term.

The convolution processing unit 1040 performs convolution processing on the input image in which the pixel value generated by the padding unit 1120 is set to a pixel of the border region.

The computation output unit 1050 outputs an image after the processing by the convolution processing unit 1040.

<Image Accepting Unit 1010>

Figure 8:
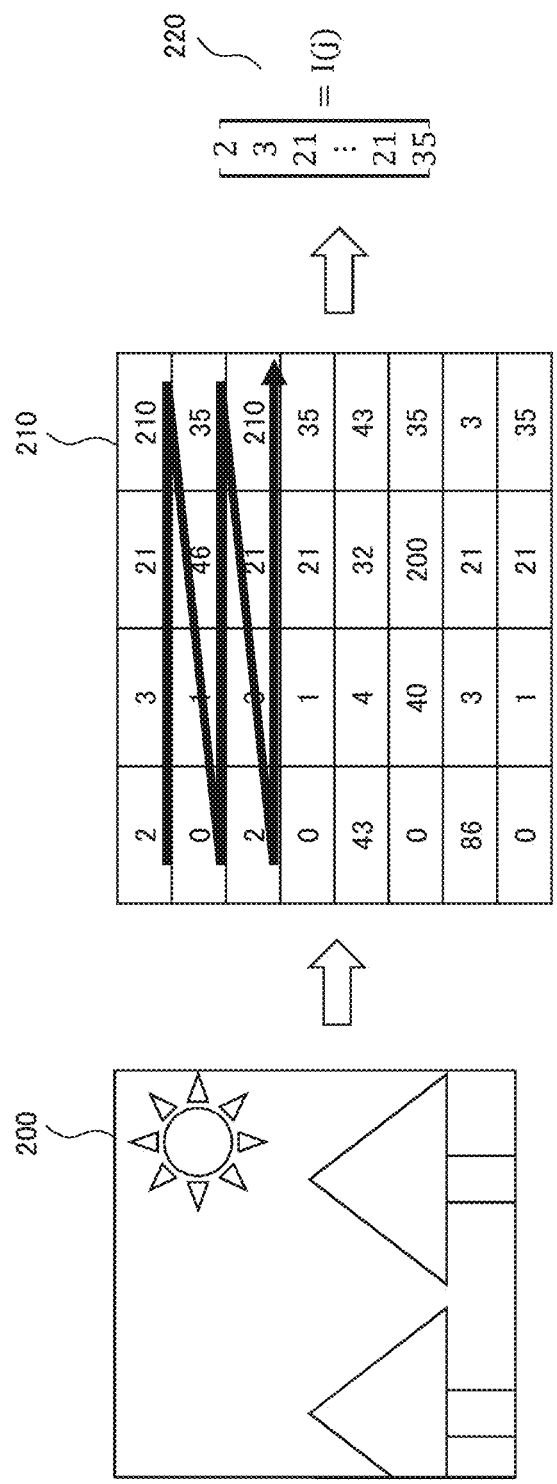
FIG. 8 is a diagram illustrating a vector representation of an input image.

An operation of the image accepting unit 1010 will be described with reference to FIG. 8. FIG. 8 is a diagram illustrating a vector representation of the input image.

First, the image accepting unit 1010 accepts an input image.

Herein, the input image to be accepted by the image accepting unit 1010 is an image (image before padding 200) before padding processing is performed. For example, in an example of FIG. 8, the image before padding 200 being accepted by the image accepting unit 1010 is a landscape painting including two trees and the sun.

Then, the image accepting unit 1010 reads a pixel value from each pixel constituting the accepted image before padding 200. FIG. 8 illustrates an image model diagram 210 that schematically represents the pixels constituting the image before padding 200 and a pixel value of the pixels. The pixel value of the image before padding 200 is, for example, a value of a Red Green Blue (RGB) element representing color information of each pixel. The image accepting unit 1010 reads the pixel value of each pixel by raster scanning for the image, for example, as indicated by an arrow illustrated in the image model diagram 210.

Then, the image accepting unit 1010 converts the image before padding 200 into an image vector before padding 220, by using the read pixel value. Hereinafter, the image vector before padding 220 is represented as I(j). Herein, j is an index to represent a position of a pixel, and the position of the pixel is represented by a scanning order of each pixel when the image accepting unit 1010 scans the image before padding 200.

Thereafter, the image accepting unit 1010 outputs the image vector before padding 220 (I(j)) to the input image patch determining unit 1020.

<Similar Patch Database 1060>

The similar patch database 1060 will be described with reference to FIG. 9. FIG. 9 is a diagram illustrating one example of data to be stored in the similar patch database 1060.

The similar patch database 1060 stores a plurality of similar patch candidates. The similar patch database 1060 according to the first example embodiment stores data 1061 in which an identification (ID) and a domain to which the similar patch candidate belongs are associated with image information of the similar patch candidate.

<Similar Patch Searching Unit 1030>

Figure 10:
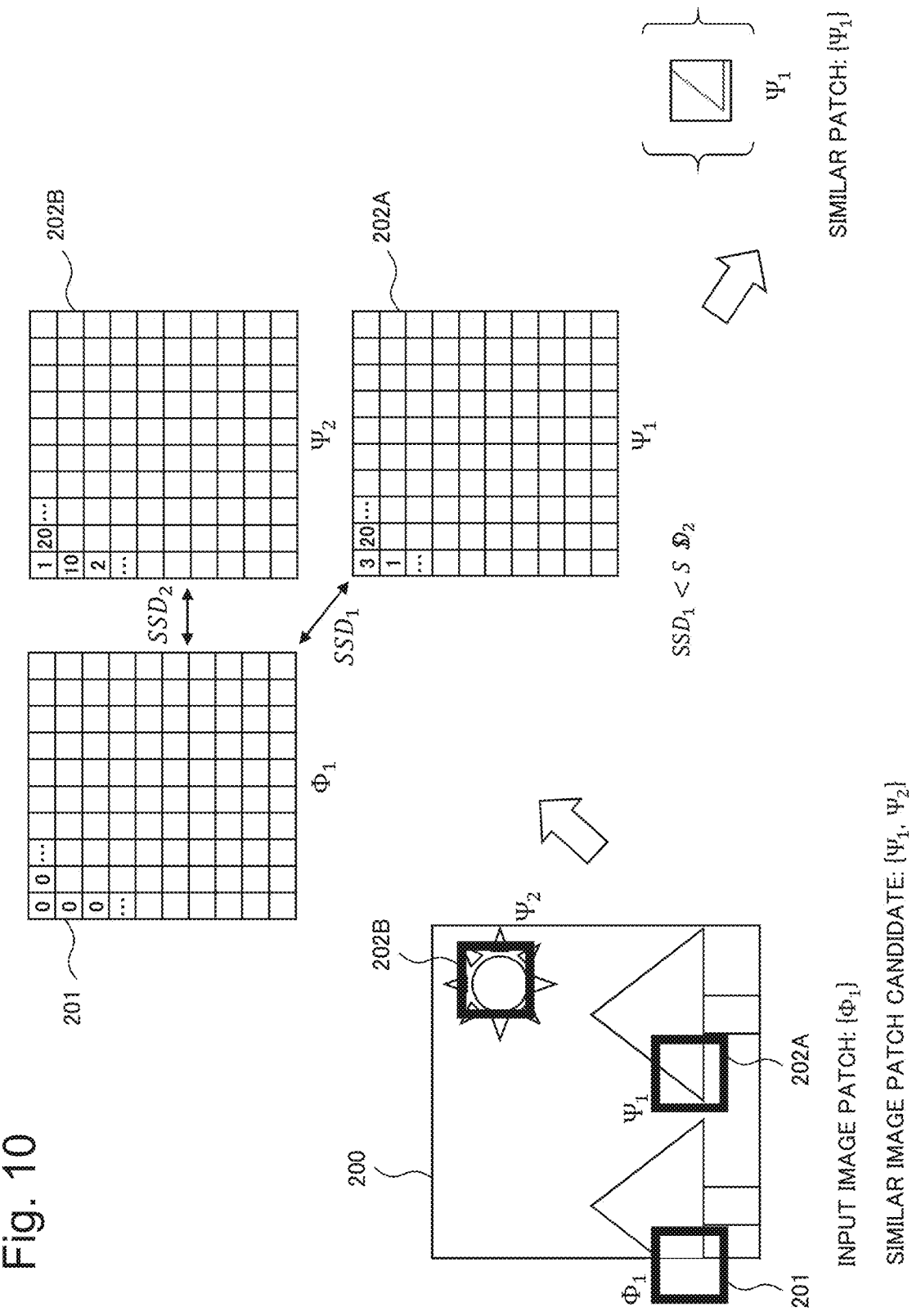
FIG. 10 is a diagram illustrating one example of an operation searching for a similar patch that uses a sum of squared difference (SSD).

An operation of the similar patch searching unit 1030 will be described with reference to FIG. 10. The similar patch searching unit 1030 searches for a similar patch close to the input image patch 201 from the similar patch database 1060. FIG. 10 is a diagram illustrating the operation of the similar patch searching unit by using a sum of squared difference (SSD).

First, the similar patch searching unit 1030 compares each similar patch candidate to be stored in the similar patch database 1060 with the input image patch 201. In an example illustrated in FIG. 10, the first similar patch candidate 202A and the second similar patch candidate 202B are compared with the input image patch 201. The similar patch searching unit 1030 searches for a similar patch candidate that satisfies a comparison criterion, as a similar patch, among the compared similar patch candidates.

As the comparison criterion, for example, there is the sum of squared difference (SSD). The similar patch searching unit 1030 uses Equation 1 below as a calculation method of the sum of squared difference (SSD).

$$SSD = \Sigma_l M_j(l)(\Phi_j(l) - \Psi_k(l))^2 \qquad \text{Equation 1:}$$

Herein, $\Phi_j(l)$ in Equation 1 represents the input image patch 201. j in Equation 1 is an index that identifies the input image patch 201. l is an index that represents a position of a pixel in the input image patch 201 and the similar patch candidate. $\Psi_1(l)$ represents the similar patch candidate. k is an index that identifies the similar patch candidate. For example, $\Psi_1(l)$ represents the first similar patch candidate 202A. $\Psi_2(l)$ represents the second similar patch candidate 202B. $M_j(l)$ is a mask that represents a region where a pixel value exists (i.e., the region is not a border region) in the input image patch 201. In other words, a set of pixels where $M_j(l)$ is 1 represents a region where the pixel value exists (i.e., the region is not the border region). A set of pixels where $M_j(l)$ is 0 represents a region where the pixel value does not exist (i.e., the region is the border region).

In short, Equation 1 may be considered as a measure for evaluating a mismatch between the input image patch 201 and the similar patch candidate. A small value of the sum of squared difference (SSD) indicates that the degree of similarity of the similar patch candidate for the input image patch 201 is high (in other words, it can be considered that matching is established therebetween).

The similar patch searching unit 1030 calculates the sum of squared difference (SSD) between the input image patch 201 and each of the similar patch candidates, by using Equation 1 as described above. It is assumed that the sum of squared difference (SSD) between the input image patch 201 and the first similar patch candidate 202A is $SSD_1$. It is assumed that the sum of squared difference (SSD) between the input image patch 201 and the second similar patch candidate 202B is $SSD_2$. In an example illustrated in FIG. 10, a value of $SSD_1$ is smaller than a value of $SSD_2$. Therefore, the similar patch searching unit 1030 searches for the first similar patch candidate 202A related to $SSD_1$ as a similar patch.

The similar patch searching unit 1030 may search for a plurality of similar patches for one input image patch 201. For example, the similar patch searching unit 1030 calculates the sum of squared difference (SSD) between the input image patch 201 and the similar patch candidate. The similar patch searching unit 1030 may set, when there are a plurality of similar patch candidates of which calculated value is smaller than a predetermined threshold value, the plurality of similar patch candidates as the similar patches. Alternatively, the similar patch searching unit 1030 may search for a certain number of similar patch candidates in an ascending order of the calculated value of the sum of squared difference (SSD), and may set these searched similar patch candidates as the similar patches.

Hereinafter, an operation of the similar patch constraining unit 1110 will be described, assuming that the similar patch searching unit 1030 searches for a plurality of similar patches for one input image patch 201.

<Similar Patch Constraining Unit 1110>

The similar patch constraining unit 1110 generates a constraint term based on the similar patch.

The constraint term based on the similar patch is a term that restricts a pixel value to be generated by the padding unit 1120 to be as close as possible to the similar patch. For example, the padding unit 1120 can use $E_p(I_{new}; l)$ represented by the following Equation 2 or Equation 3 as a similar patch constraint term.

$$E_p(I_{new}; l) = \Sigma_{jm}(I_{new} - \Psi_{jm}(w(l)))^2 \qquad \text{Equation 2:}$$

$$E_p(I_{new}; l) = \Sigma_{jm}|I_{new} - \Psi_{jm}(w(l))| \qquad \text{Equation 3:}$$

In Equation 2 and Equation 3, it is called a similar patch group even when there is one similar patch, and the similar patch group is represented by $\{\Psi_{jm}(l)\}$. Herein, $I_{new}$ represents a pixel value of a pixel of which index is l in the input image patch 201. j is an index that represents a position of the pixels constituting the image before padding 200. l is an index that represents a position of the pixels constituting the similar patch candidate. m is an index that identifies the similar patch included in the similar patch group. w(l) is a function that converts into an index representing the pixel related to the l-th pixel of the image before padding 200 in the similar patch $P_{jm}$.

In other words, it may be understood that Equation 2 and Equation 3 set a constraint in such a way that the sum of squared difference (SSD) between the input image patch 201 and the similar patch becomes small.

<Padding Unit 1120>

The padding unit 1120 will be described. The padding unit 1120 generates a pixel value that complements the border region included in the input image patch 201 by using the similar patch.

Specifically, the padding unit 1120 minimizes an evaluation function $E(I_{new}; 1)$ composed of the similar patch constraint term $E_p(I_{new}; 1)$ generated in the similar patch constraining unit 1110. In this way, the similar patch constraining unit 1110 generates the pixel value of the border region included in the input image patch 201. More specifically, the padding unit 1120 generates the pixel value of the border region included in the input image patch 201 by minimizing the evaluation function $E(I_{new}; 1)$ represented by the following Equation 5.

$$E(I_{new};l)=E_p(I_{new};l) \quad \text{Equation 5:}$$

As a method of minimizing the evaluation function $E(I_{new}; 1)$, for example, a gradient method and the like may be used.

<Hardware Configuration of Image Recognition Model Generating Device 1000>

Figure 12:
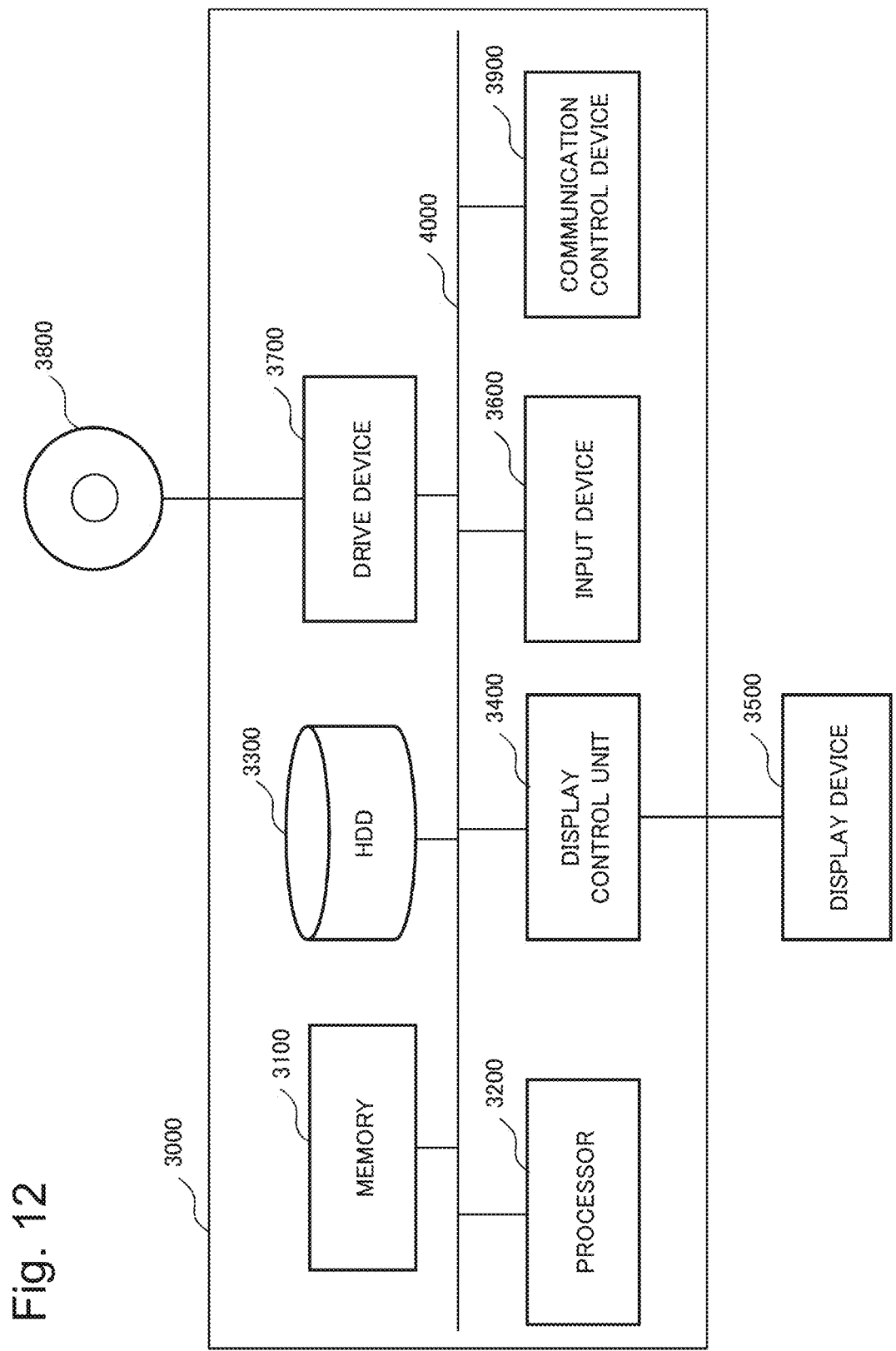
FIG. 12 is a diagram illustrating one example of a hardware configuration of a calculator for achieving the image recognition model generating device.

FIG. 12 is a diagram illustrating one example of a hardware configuration of a calculator 3000 capable of achieving the image recognition model generating device according to the present invention.

The calculator 3000 includes a memory 3100, a processor 3200, a hard disk drive (HDD) 3300, a display control unit 3400 that is connected to a display device 3500, a drive device 3700 for a removable disk 3800, an input device 3600, and a communication control device 3900. These are connected by a bus 4000. An operating system (OS) and an application program for executing processing in the processor 3200 are stored in the hard disk drive 3300. The application program is read, when being executed by the processor 3200, from the hard disk drive 3300 to the memory 3100. The processor 3200 controls the display control unit 3400, the communication control device 3900, and the drive device 3700 according to a processing content of the application program, and causes the display control unit 3400, the communication control device 3900, and the drive device 3700 to perform a predetermined operation. Data in the middle of processing are mainly stored in the memory 3100, however, may be stored in the hard disk drive 3300. The application program executed by the processor 3200 is stored and distributed on the computer-readable removable disk 3800, and is installed from the drive device 3700 to the hard disk drive 3300. It may be installed in the hard disk drive 3300 via a network such as the Internet and the communication control device 3900. Such a computer device achieves the above-described various functions by cooperation of hardware such as the processor 3200 and the memory 3100 and a program such as the OS and the application program.

Further, a part or the whole of each component of the calculator 3000 as described above may be achieved by a general-purpose or dedicated circuitry, a processor, and the like, or a combination thereof.

When a part or the whole of each component of the calculator 3000 is achieved by a plurality of information processing devices, circuitries, or the like, the plurality of information processing devices, circuitries, or the like may be arranged in a concentrated manner or a distributed manner. For example, the information processing devices, the circuitries, or the like may be achieved as a form, such as a client-and-server system or a cloud computing system, in which each component is connected via a communication network.

<Flow of Processing>

Figure 13:
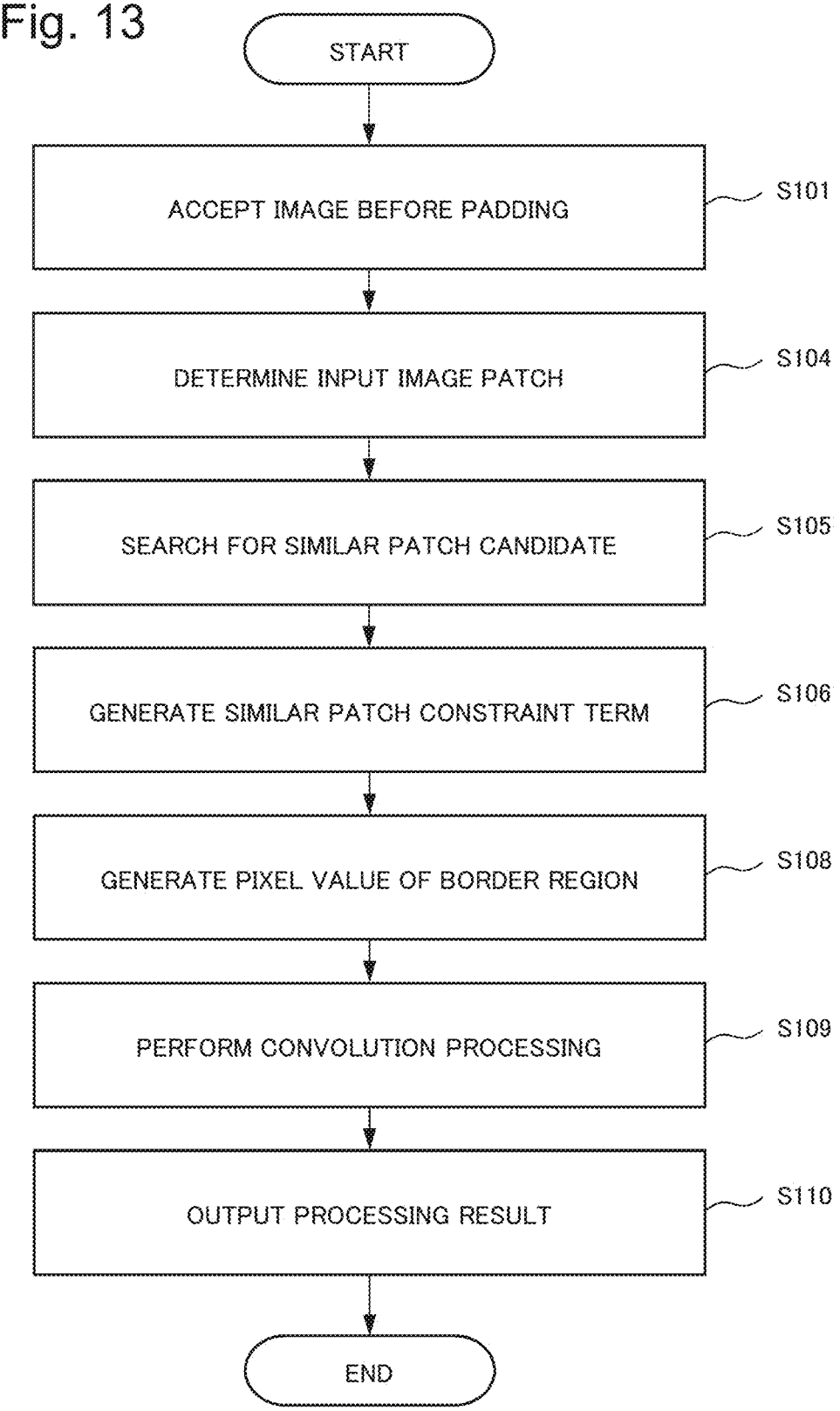
FIG. 13 is a flowchart exemplarily illustrating a flow of processing by the image recognition model generating device according to the first example embodiment.

FIG. 13 is a flowchart exemplarily illustrating a flow of processing to be performed by the image recognition model generating device 1000A according to the first example embodiment.

The image accepting unit 1010 accepts the image before padding 200 (S101). The input image patch determining unit 1020 determines the input image patch 201 from the image before padding 200 (S104). The similar patch searching unit 1030 searches for a similar patch that is similar to the input image patch 201 (S105). The similar patch constraining unit 1110 generates a similar patch constraint term, based on the similar patch (S106). The padding unit 1120 generates a pixel value that complements a border region included in the input image patch 201, based on the similar patch constraint term (S108). The convolution processing unit 1040 performs convolution processing for the image after padding including the pixel value generated by the padding unit 1120 (S109). The computation output unit 1050 outputs a processing result (S110).

<Modification Example of Image Accepting Unit 1010>

An image and a measurement value to be accepted by the image accepting unit 1010 are not limited to a visible image. For example, the image accepting unit 1010 may accept an image acquired from a sensor other than an image sensor. Sensors other than the image sensor include, for example, a temperature sensor and a distance sensor (range sensor).

The image accepting unit 1010 may also accept a processing result in the middle of deep learning as a multi-channel image. Alternatively, the image accepting unit 1010 may accept vector data (such as velocity field and density field) calculated by numerical simulation or the like as the multi-channel image.

Further, an input image does not always need to be converted into a vector format. For example, the input image may be converted into a format (matrix format) such as I(x,y) representing a matrix. In this case, (x,y) is an index that represents a position of a pixel.

<Modification Example of Similar Patch Database 1060>

The similar patch database 1060 may include a similar patch candidate acquired from an image other than the image before padding 200. For example, the similar patch database 1060 may also store, as the similar patch candidate, an image acquired by collecting patches cut out from another image that belongs to the same domain as the image before padding 200 input in the image accepting unit 1010. Herein, the domain represents a type of the similar patch candidate previously determined by a user. For example, in the example illustrated in FIG. 9, "tree" is the domain. A similar patch candidate having "tree" as the domain is a part of the image of tree.

The domain is not limited to a "tree" but may be a human face, sex, a building, or the like. Further, in a case of a domain of which image configuration is roughly determined such as a human face, a group of similar patch candidates may be formed for each part of the image configuration. For example, when a human face is the domain, the positions of eyes, nose, mouth, and the like are determined.

<Modification Example of Similar Patch Searching Unit 1030>

A comparison criterion to be used by the similar patch searching unit 1030 is not limited to the sum of squared difference (SSD). For example, the similar patch searching unit 1030 may use a sum of absolute difference (SAD) as the comparison criterion. The similar patch searching unit 1030 uses, for example, Equation 6 below as a calculation method of the sum of absolute difference (SAD).

$$SAD = \Sigma_l M_j(l) |\Phi_j(l) - \Psi_k(l)| \qquad \text{Equation 6:}$$

In short, Equation 6 may be considered as a measure for evaluating a mismatch between the input image patch 201 and the similar patch candidate. A small value of the sum of absolute difference (SAD) indicates that a degree of similarity of the similar patch candidate for the input image patch 201 is high (it can be considered that matching is established between the input image patch 201 and the similar patch candidate).

Figure 11:
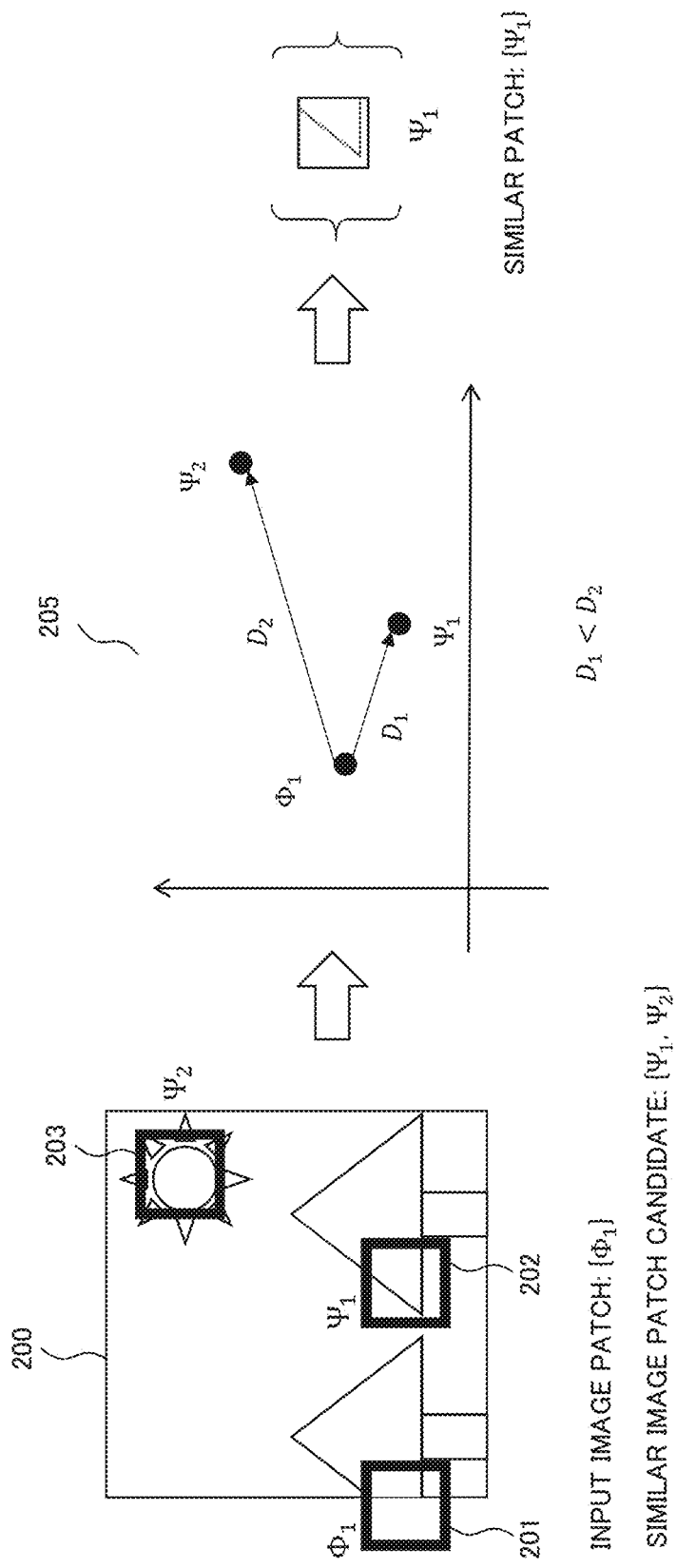
FIG. 11 is a diagram illustrating one example of the operation searching for the similar patch that uses a feature vector.

The method of searching for the similar patch by the similar patch searching unit 1030 is not limited to the above method. As illustrated in FIG. 11, for example, a method of searching for the similar patch by using a feature vector will be described. FIG. 11 is a diagram illustrating an operation of the similar patch searching unit by using the feature vector.

First, the similar patch searching unit 1030 acquires feature vectors of the input image patch 201 and the similar patch candidate 202.

Herein, the feature vector expresses a value representing a feature of an image as a vector. For example, the similar patch searching unit 1030 can use a Red Green Blue (RGB) value, Histograms of Oriented Gradients (HOG) feature, and a gray value as a value representing a feature of an image.

Next, the similar patch searching unit 1030 expresses the acquired feature vector by a feature space 205, for example.

$D_1$ illustrated in FIG. 11 represents a distance between the input image patch 201 and the first similar patch candidate 202, to be expressed as a feature vector in the feature space 205. $D_2$ represents a distance between the input image patch 201 and the second similar patch candidate 203, to be expressed as a feature vector in the feature space 205.

Thereafter, the similar patch searching unit 1030 determines, as the similar patch, the first similar patch candidate 202 associated with D having a smaller value between $D_1$ and $D_2$.

<Operation and Advantageous Effect>

The image recognition model generating device 1000A according to the first example embodiment uses, as an input image for using for learning of a convolutional neural network model, an image to be acquired by complementing the pixel value of the border region of the image before padding 200 by using a similar patch. Thus, learning performance of the neural network model is improved.

Second Example Embodiment

When complementing a border region of an image, an image recognition model generating device according to a second example embodiment complements the border region of the image, based on not only a similar patch but also a statistical law to be followed by an input image. By considering both the statistical law to be followed by the input image and the similar patch, the image recognition model generating device according to the second example embodiment complements a pixel value and generates a natural image.

Figure 14:
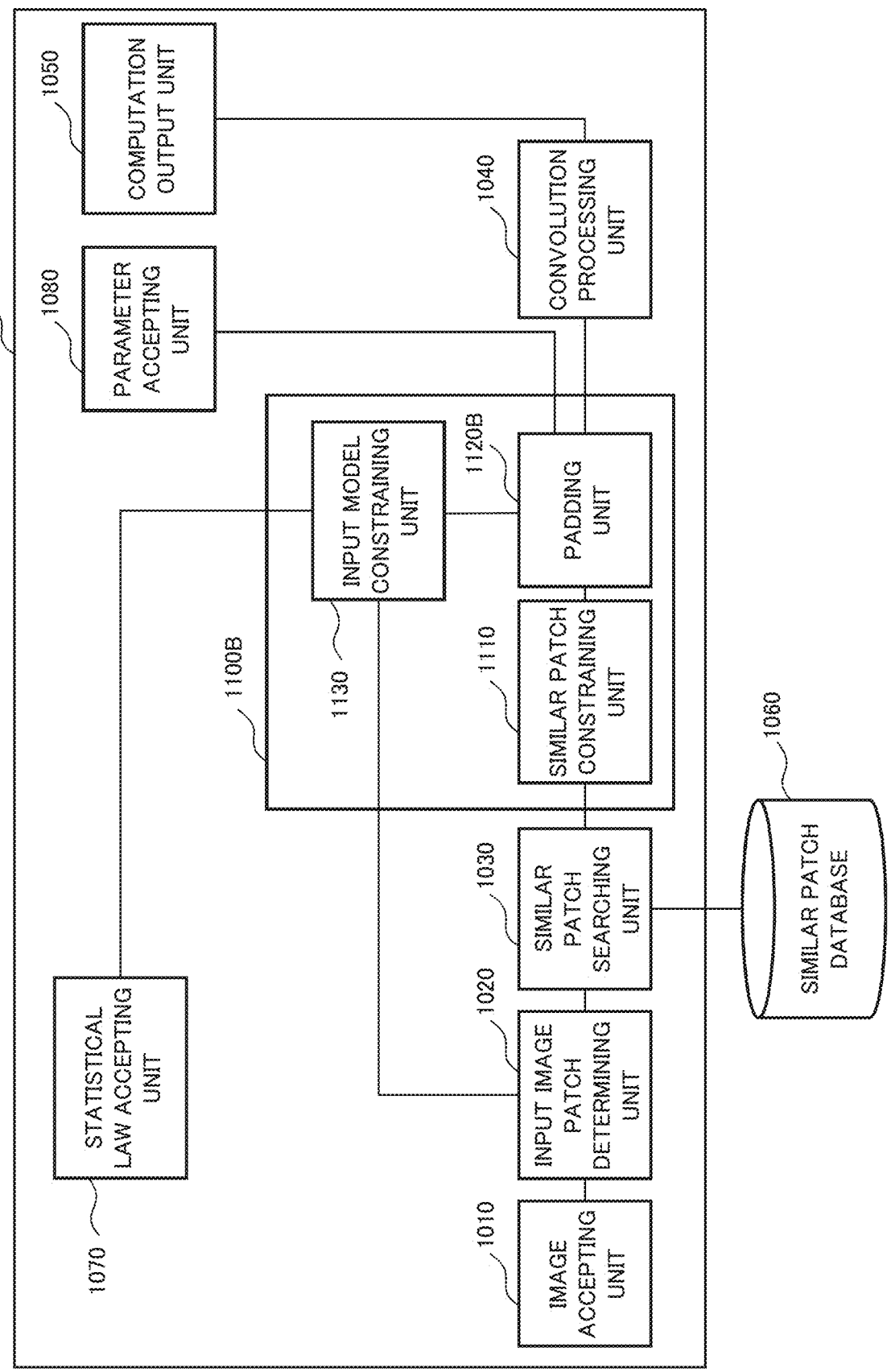
FIG. 14 is a block diagram illustrating a functional configuration of an image recognition model generating device according to a second example embodiment.

FIG. 14 is a block diagram illustrating a configuration of an image recognition model generating device 1000B according to the second example embodiment. The substantially same components as the components illustrated in FIG. 7 have the same reference signs, and thus overlapping description will be omitted. As illustrated in FIG. 14, the image recognition model generating device 1000B according to the second example embodiment further includes a statistical law accepting unit 1070 and a parameter accepting unit 1080, as compared with the image recognition model generating device 1000A. Further, the image recognition model generating device 1000B includes a pixel value generating unit 1100B instead of the pixel value generating unit 1100. The pixel value generating unit 1100B includes a similar patch constraining unit 1110, an input model constraining unit 1130, and a padding unit 1120B.

<Device Configuration>

The statistical law accepting unit 1070 accepts, from a user, a statistical law to be followed by an image before padding 200. The statistical law accepting unit 1070 outputs the accepted statistical law to the input model constraining unit 1130.

The parameter accepting unit 1080 accepts a parameter from a user. The parameter accepting unit 1080 outputs the accepted parameter to the padding unit 1120B.

The input model constraining unit 1130 generates an input model constraint term that restricts generation of a pixel value, based on the statistical law.

The padding unit 1120B complements the border region of the image, based on a similar patch constraint term generated based on a similar patch and the input model constraint term.

<Statistical Law Accepting Unit 1070>

Figure 15:
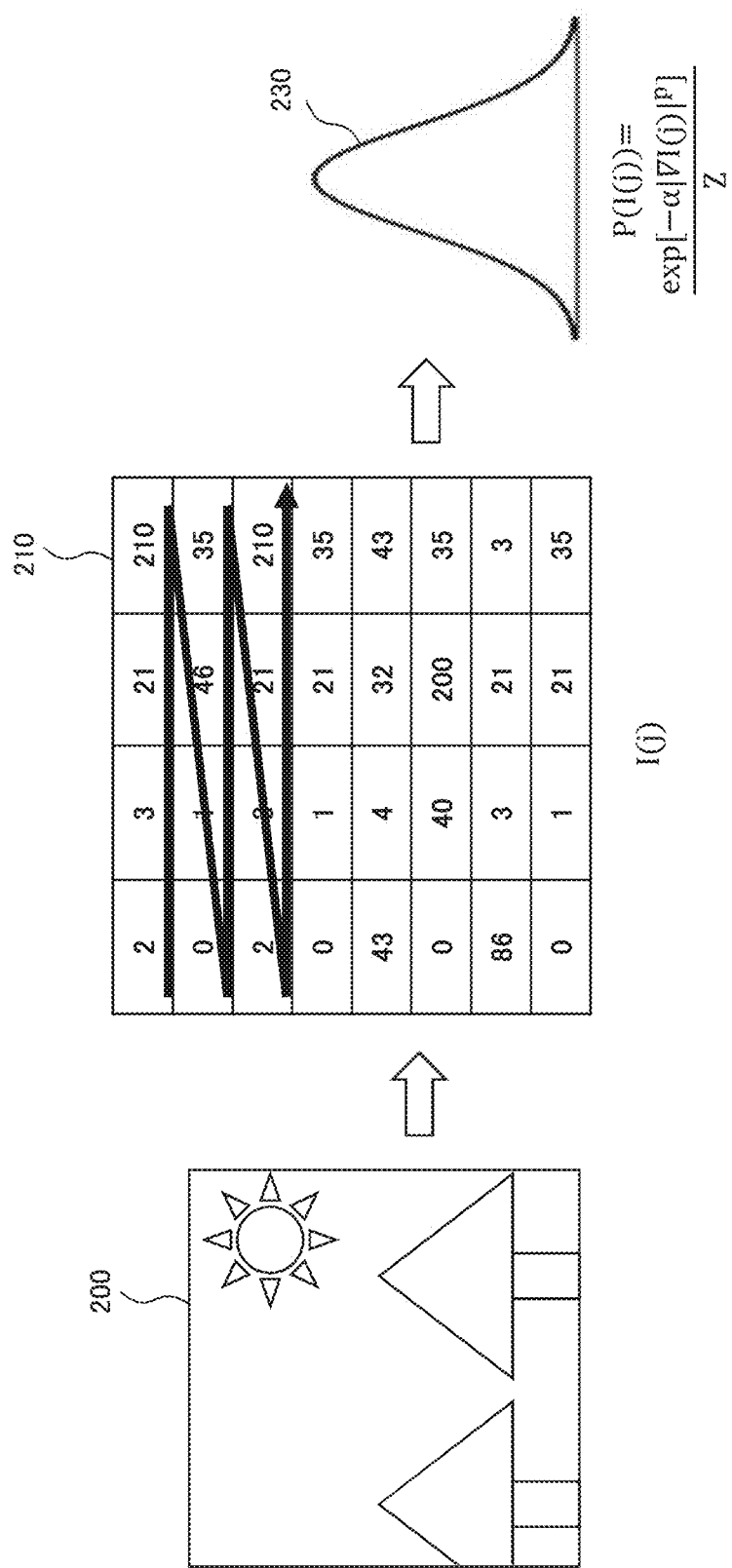
FIG. 15 is a diagram illustrating a statistical law to be followed by an input image.

An operation of the statistical law accepting unit 1070 will be described with reference to FIG. 15. FIG. 15 is a diagram illustrating the statistical law to be followed by the input image.

One example of the statistical law to be accepted is a statistical model such as a prior probability of an image. More specifically, the statistical law accepting unit 1070 may accept Equation 7 as an input image model 230.

$$P(I(J)) = \frac{\exp[-\alpha |\nabla I(J)|^p]}{Z} \qquad \text{Equation 7:}$$

In Equation 7, $\nabla I(j)$ represents a gradient in the j-th pixel. $|\cdot|^P$ represents an $L_p$ norm. $\alpha$ and p are parameters previously determined by a user. $\alpha$ and p may be calculated by regression learning from image data collected in advance. Z is a normalization constant. An object of the normalization constant is to normalize in such a way that the integral value becomes 1 when the probability distribution is integrated in the whole space.

Herein, a method of calculating the parameters $\alpha$ and p by the regression learning will be described. First, the statistical law accepting unit 1070 calculates the gradient $\nabla I$ for all pixels from the image before padding 200. Hereinafter, a set of the gradients in the pixels of the image before padding 200 is represented as $\{\nabla I(j)\}$. Next, a histogram (or probability distribution) is generated from the set of gradients $\{\nabla I(j)\}$ at the pixels of the image before padding 200. Further, $\alpha$ and p arc calculated from the acquired histogram (or probability distribution) by least square fitting.

<Input Model Constraining Unit 1130>

An operation of the input model constraining unit 1130 will be described.

The constraint term based on the input image model 230 is a term that restricts a pixel value to be generated by the padding unit 1120 to be as close as possible to the input image model 230. For example, the input model constraining unit 1130 generates $E_m(I_{new}; l)$ represented by Equation 8 below as the input model constraint term.

$$E_m(I_{new};l)=-\log\{P(I_{new}(l))\}=\alpha|\nabla I_{new}(l)|^p+\log\{Z\} \quad \text{Equation 8:}$$

However, $\log\{Z\}$ is a constant and does not need to be included in $E_m(I_{new}; l)$.

<Padding Unit 1120B>

Figure 16:
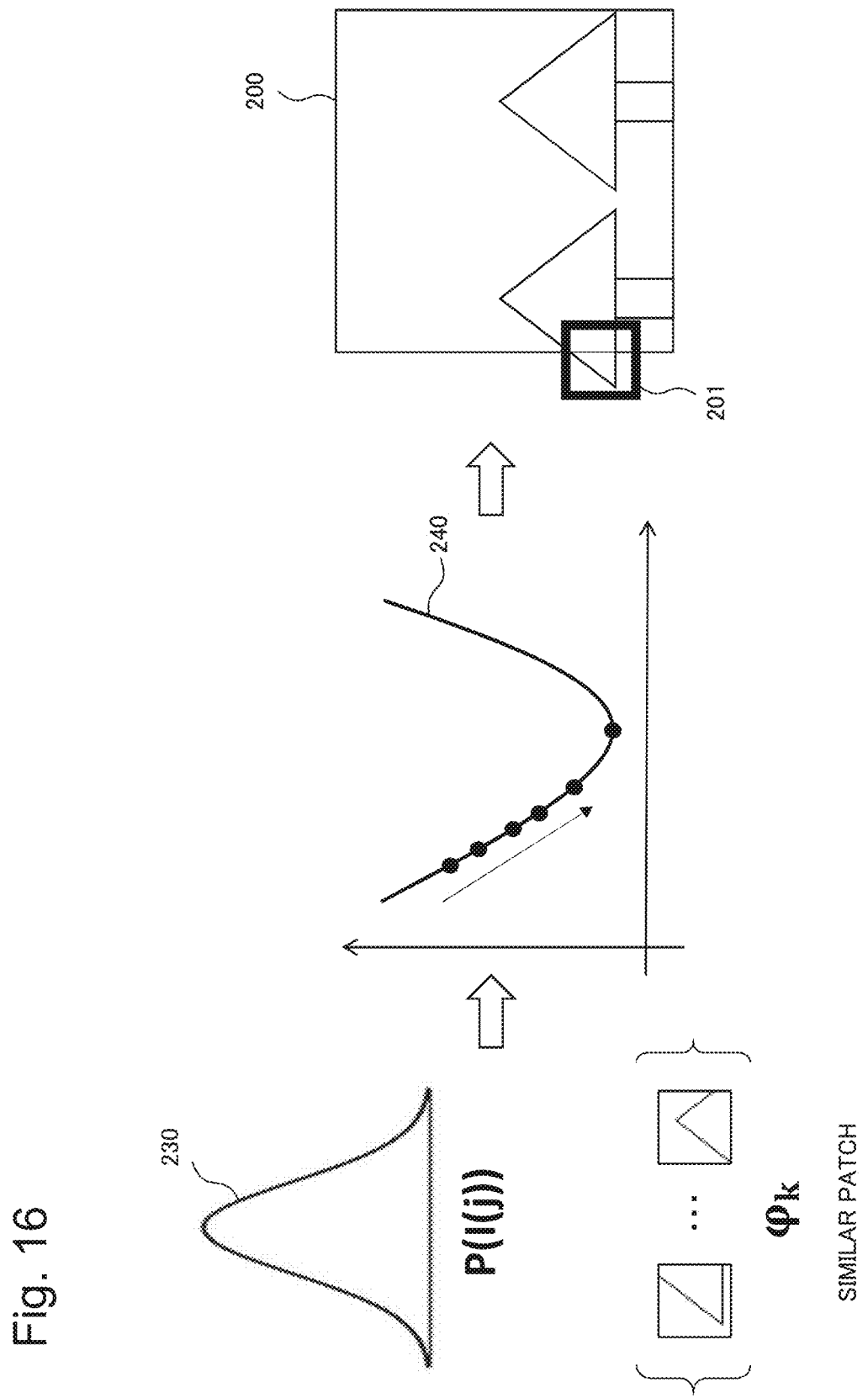
FIG. 16 is a diagram illustrating one example of padding processing.

An operation of the padding unit 1120B will be described with reference to FIG. 16. FIG. 16 is a diagram illustrating the operation of the padding unit 1120B.

The padding unit 1120B generates an evaluation function graph 240 by using the input image model 230 and the similar patch. The padding unit 1120B searches for an optimal pixel value from the similar patch by using the evaluation function graph 240. The padding unit 1120B complements a border region included in the input image patch 201, by using the searched pixel value.

Figure 17:
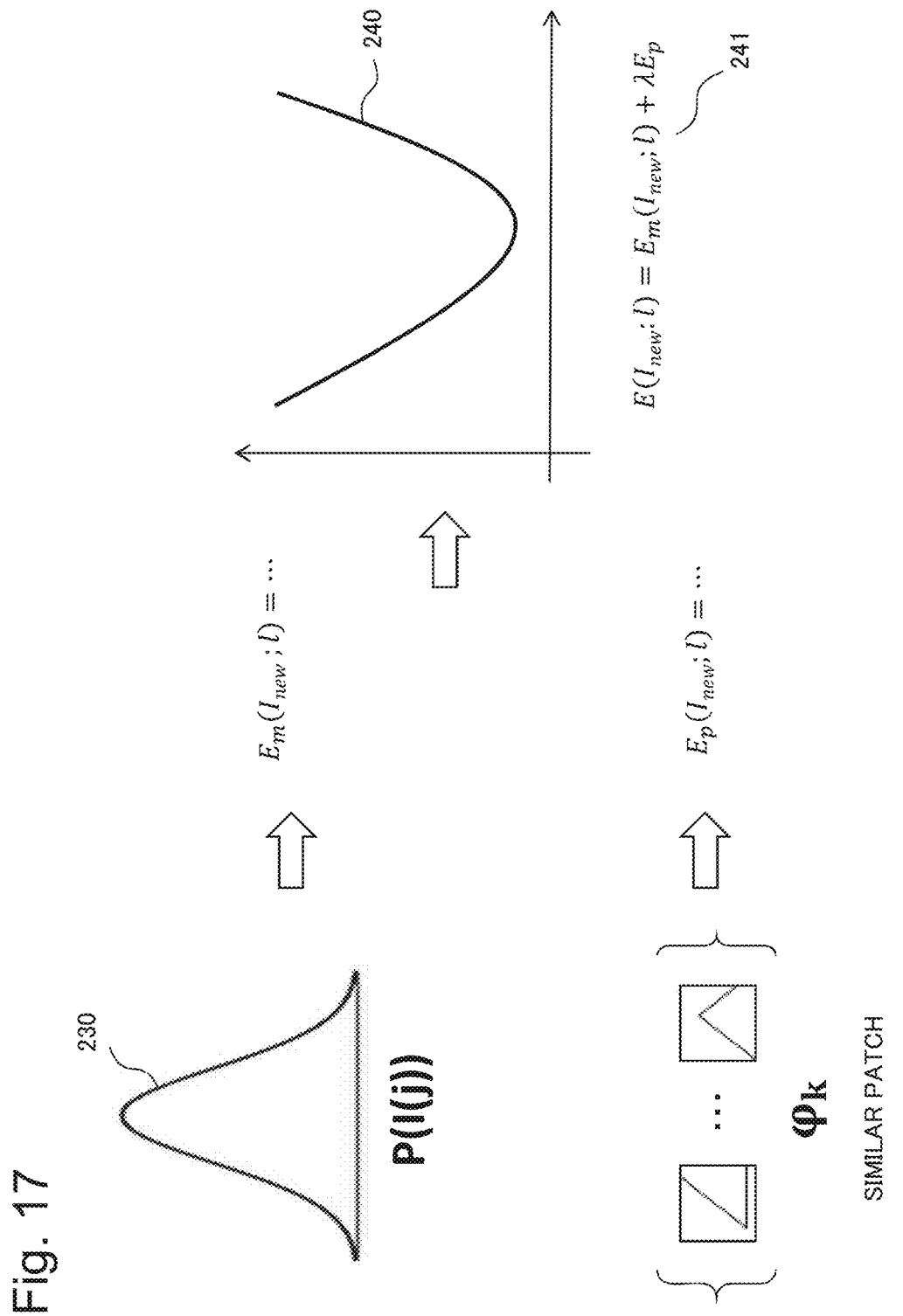
FIG. 17 is a diagram illustrating each term of an evaluation function.

Herein, the evaluation function graph 240 will be described with reference to FIG. 17. FIG. 17 is a diagram illustrating each term of the evaluation function.

The evaluation function graph 240 is composed of the input model constraint term, the similar patch constraint term, and the parameter. More specifically, the evaluation function graph 240 is indicated by Equation 9 below. The evaluation function graph 240 is the evaluation function $E(I_{new}; l)$ composed of the input model constraint term $E_m(I_{new}; l)$ generated by the input model constraining unit 1130, the similar patch constraint term $E_p(I_{new}; l)$ generated by the similar patch constraining unit 1110, and the parameter λ accepted by the parameter accepting unit 1080.

$$E(I_{new};l)=E_m(I_{new};l)+\lambda E_p(I_{new};l) \quad \text{Equation 9:}$$

Herein, λ is used as a weight of the constraint of the similar patch constraint term for the input model constraint term in the evaluation function graph 240. In other words, the padding unit 1120B can adjust smoothness of the generated pixel value by λ.

Figure 18:
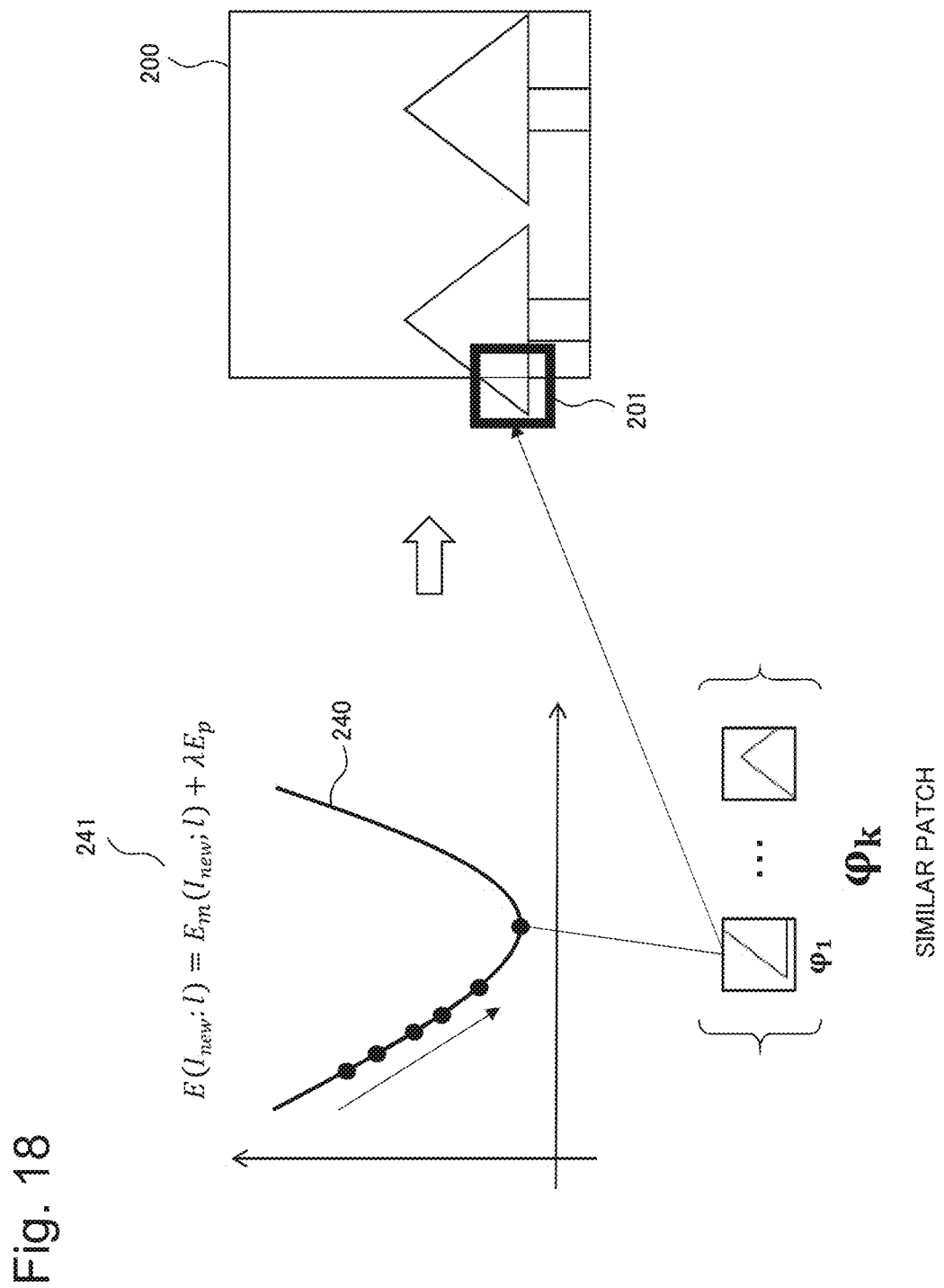
FIG. 18 is a diagram illustrating another example of the padding processing.

Herein, an operation in which the padding unit 1120B generates a pixel value from the evaluation function graph 240 will be described with reference to FIG. 18. FIG. 18 is a diagram illustrating the operation of the padding unit 1120B.

The padding unit 1120B searches for a pixel value that minimizes a value of an evaluation function 241 associated with the evaluation function graph 240. The padding unit 1120B may use a gradient method or the like as a method of minimizing the evaluation function 241. The padding unit 1120B searches for one of the patches included in the similar patches, by using the searched pixel value. The padding unit 1120B complements the border region included in the input image patch 201, by using the searched patch.

<Modification Example of Statistical Law Accepting Unit 1070>

The statistical law accepting unit 1070 may accept a physical model as the input image model 230. One example of the physical model is Ginzburg-Landau equation. The Ginzburg-Landau equation is a physical model associated with an image that captures a phase separation phenomenon such as a polymer copolymer and a liquid crystal.

<Modification Example of Input Model Constraining Unit 1130>

The input model constraining unit 1130 can generate the input model constraint term, by using the Ginzburg-Landau equation. In this case, the input model constraining unit 1130 generates, for example, $E_m(I_{new}; l)$ represented by Equation 10 below.

$$E_m(I_{new};l)=(I_{new}-I_1)^2(I_{new}-I_2)^2+\alpha|\nabla I_{new}(l)|^2 \quad \text{Equation 10:}$$

Herein, $I_1$ and $I_2$ are constants previously determined by a user. The first term is a quartic function having local minima at $I_1$ and $I_2$. In short, the first term restricts that the l-th pixel value to be generated by the padding unit 1120B becomes a value of either $I_1$ or $I_2$.

The second term restricts that a gradient of I at the l-th pixel to be generated by the padding unit 1120B is small. In short, the second term restricts the image to be generated by the padding unit 1120B to be smooth.

In other words, the input model constraint term functions as a constraint that the I-th pixel value to be generated by the padding unit 1120B becomes a constant previously determined by a user, and a constraint that the image to be generated by the padding unit 1120B becomes smooth.

<Flow of Processing>

Figure 19:
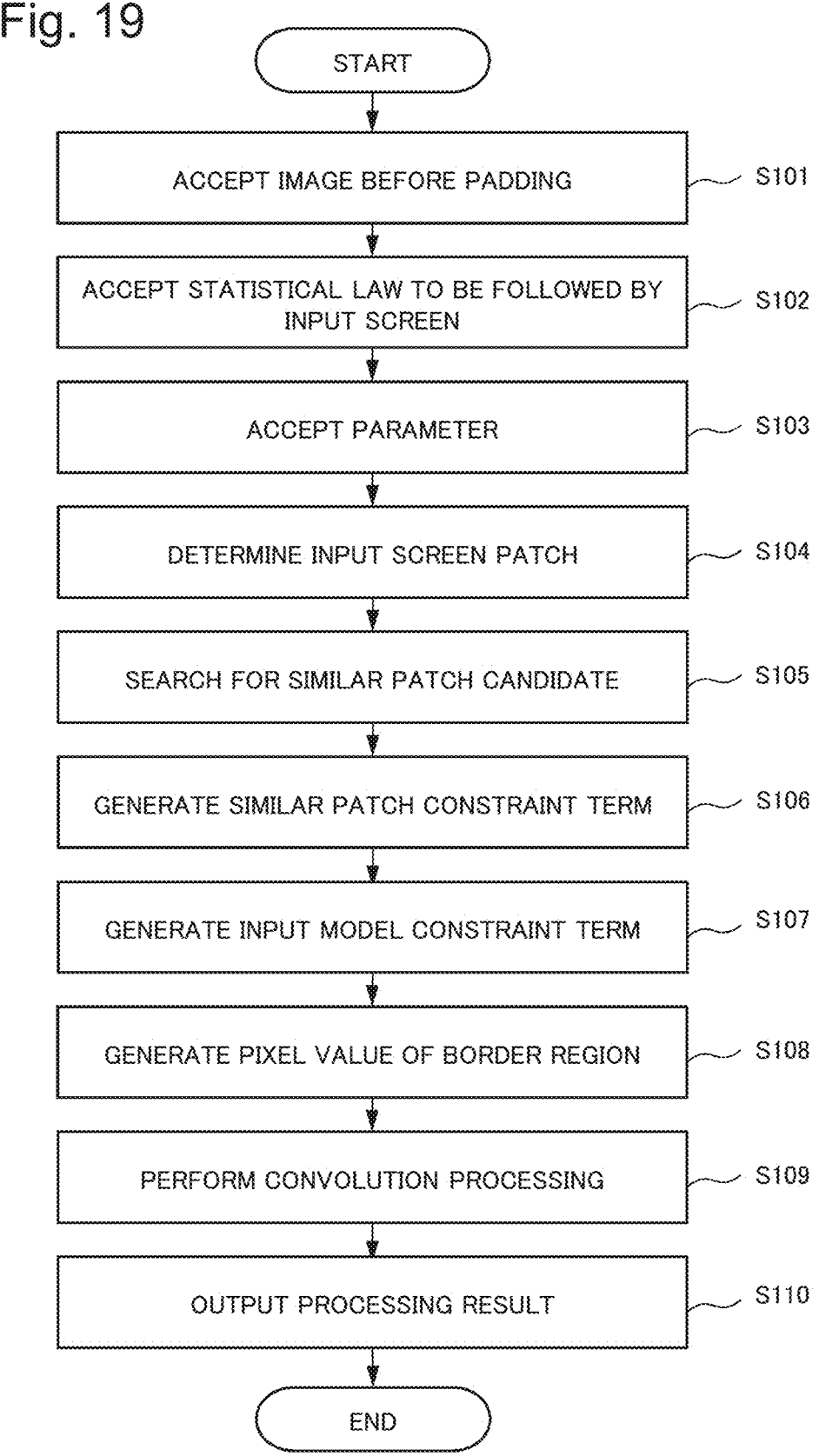
FIG. 19 is a flowchart exemplarily illustrating a flow of processing to be performed by the image recognition model generating device according to the second example embodiment.

FIG. 19 is a flowchart exemplarily illustrating a flow of processing to be performed by the image recognition model generating device 1000B according to the second example embodiment.

An image accepting unit 1010 accepts the image before padding 200 (S101). The statistical law accepting unit 1070 accepts a statistical law to be followed by the image before padding 200 (S102). The parameter accepting unit 1080 accepts a parameter (S103). An input image patch determining unit 1020 determines an input image patch 201 from the image before padding 200 (S104). A similar patch searching unit 1030 searches for a similar patch that is similar to the input image patch 201 (S105). A similar patch constraining unit 1110 generates a similar patch constraint term, based on the similar patch (S106). The input model constraining unit 1130 generates an input model constraint term, based on the statistical law to be followed by the image before padding 200 (S107). The padding unit 1120B generates a pixel value that complements a border region included in the input image patch 201, based on the similar patch constraint term (S108). A convolution processing unit 1040 performs convolution processing for the image after padding including the pixel value generated by the padding unit 1120B (S109). A computation output unit 1050 outputs a processing result (S110).

In FIG. 19 and the above description, the processing of S103 is performed after the processing of S102. However, it is just described in this way for the convenience of illustration in the flowchart. The order may be changed and the processing of S102 may be performed after the processing of S103, or the processing of S102 and S103 may be divided and performed alternately.

The modification example according to the first example embodiment described above can be also applied to the second example embodiment.

<Operation and Advantageous Effect>

The image recognition model generating device 1000B according to the second example embodiment complements a pixel value by considering both the statistical law followed by the input image and the similar patch. Therefore, the image recognition model generating device 1000B according to the second example embodiment improves learning performance by using a naturally complemented image as an input image for learning of a convolutional neural network model.

Third Example Embodiment

An image recognition model generating device according to a third example embodiment accepts a selection of a generation method of a pixel value for a border region from a user. The image recognition model generating device according to the third example embodiment performs the selected generation method (or complementation method) of the pixel value, and thus can perform the generation method of the pixel value according to needs of a user.

Figure 20:
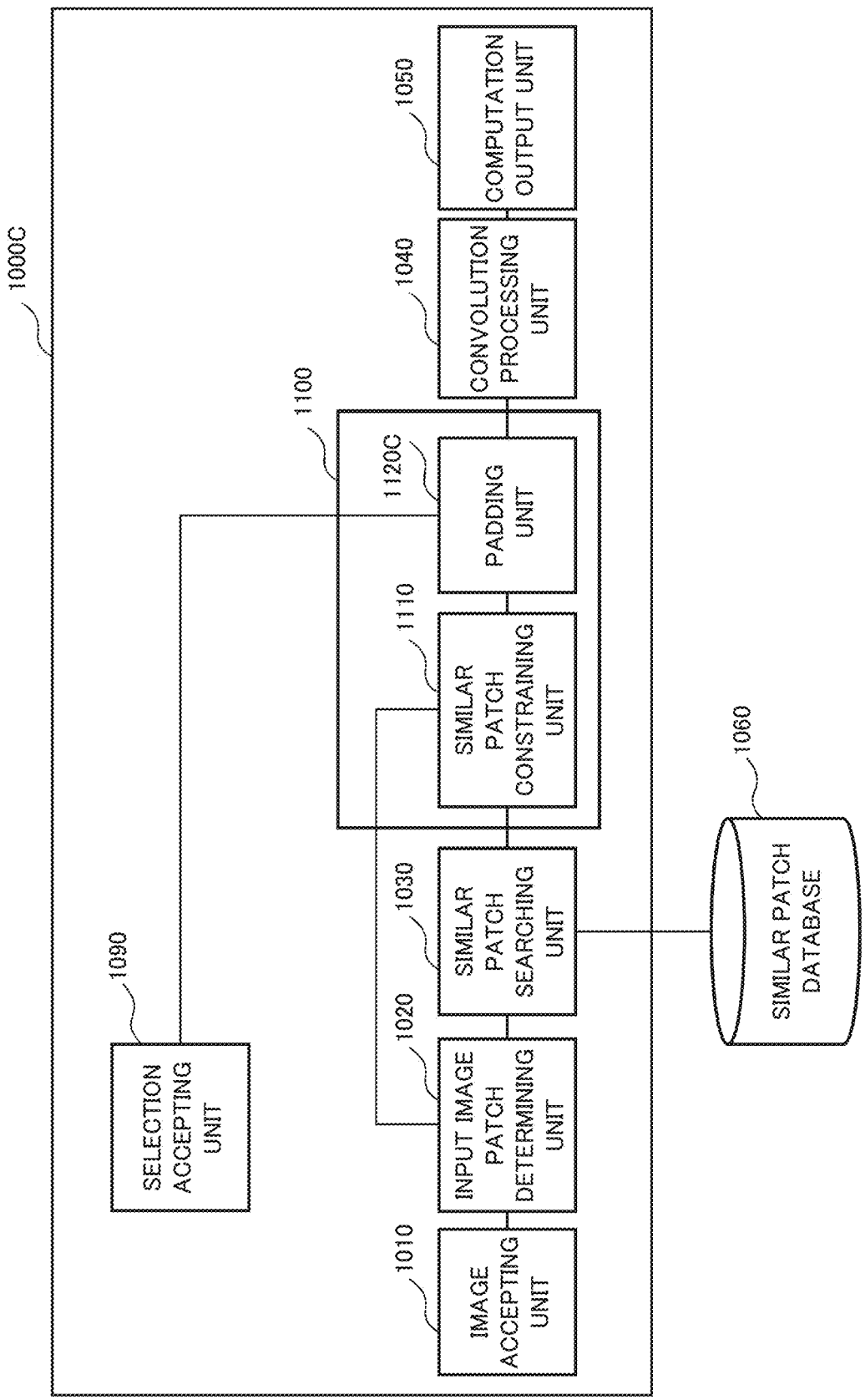
FIG. 20 is a block diagram illustrating a functional configuration of an image recognition model generating device according to a third example embodiment.

FIG. 20 is a block diagram illustrating a configuration of an image recognition model generating device 1000C according to the third example embodiment. The substantially same components as the components illustrated in FIG. 14 have the same reference signs, and thus overlapping description will be omitted. As illustrated in FIG. 20, the image recognition model generating device 1000C according to the third example embodiment further includes a selection accepting unit 1090, as compared with the image recognition model generating device 1000A according to the first example embodiment. Further, the image recognition model generating device 1000C includes a padding unit 1120C instead of the padding unit 1120.

<Device Configuration>

The selection accepting unit 1090 accepts the selection of the generation method of a pixel value for a border region from a user. The selection accepting unit 1090 outputs the accepted generation method to the padding unit 1120C.

The padding unit 1120C performs generation of the pixel value, based on the accepted generation method. The padding unit 1120C outputs the generated pixel value to a convolution processing unit 1040.

<Selection Accepting Unit 1090>

Figure 21:
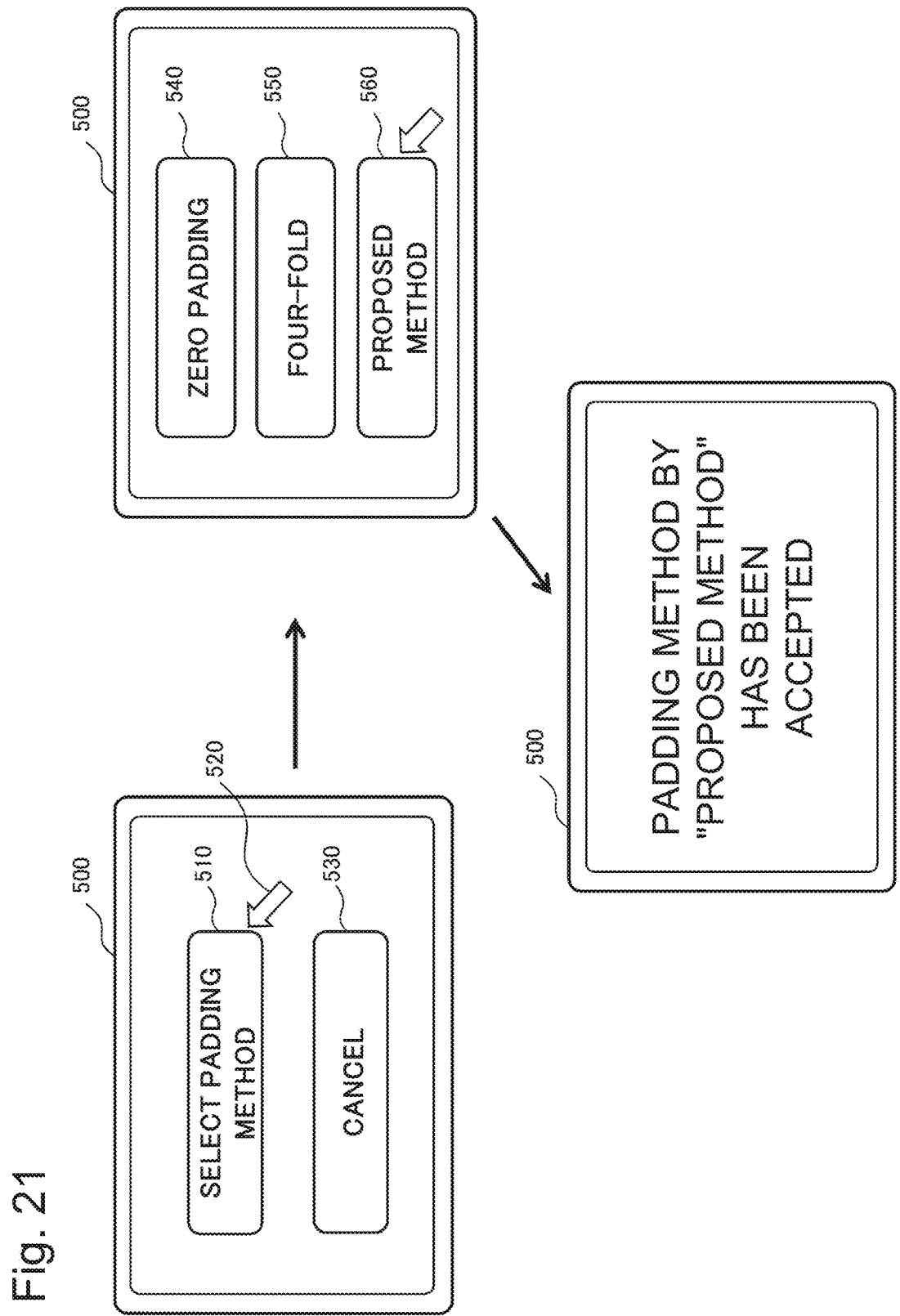
FIG. 21 is a diagram illustrating an operation of a selection accepting unit according to the third example embodiment.

An operation of the selection accepting unit 1090 will be described with reference to FIG. 21. FIG. 21 is a diagram exemplarily illustrating the operation of the selection accepting unit according to the third example embodiment. First, a padding method selection button 510, a cancel button 530, and a cursor 520 are displayed on a screen unit 500. A user selects either the padding method selection button 510 or the cancel button 530, by using the cursor 520.

When the user clicks the cancel button 530, the selection accepting unit 1090 ends the operation. When the user selects the padding method selection button 510, the selection accepting unit 1090 changes the screen displayed on the screen unit 500 to a screen illustrated in the upper right part of FIG. 21.

The screen unit 500 illustrated in the upper right part of FIG. 21 displays a zero padding selection button 540, a four-fold selection button 550, and a proposed method selection button 560. The user selects any one of the buttons by using the cursor 520.

When the user selects the zero padding selection button 540, the selection accepting unit 1090 displays on the screen unit 500 that zero padding has been selected. Then, the selection accepting unit 1090 causes the padding unit 1120C to perform the zero padding.

When the user selects the four-fold selection button 550, the selection accepting unit 1090 displays on the screen unit 500 that the four-fold padding has been selected. Then, the selection accepting unit 1090 causes the padding unit 1120C to perform the four-fold padding.

When the user selects the proposed method selection button 560, the selection accepting unit 1090 displays on the screen unit 500 that padding by the proposed method has been selected. Then, the selection accepting unit 1090 causes the padding to be performed by the proposed method.

Herein, the padding by the proposed method is, for example, the operation of the padding unit 1120 according to the first example embodiment. Further, the padding by the proposed method may be the operation of the padding unit 1120B according to the second example embodiment.

<Flow of Processing>

Figure 22:
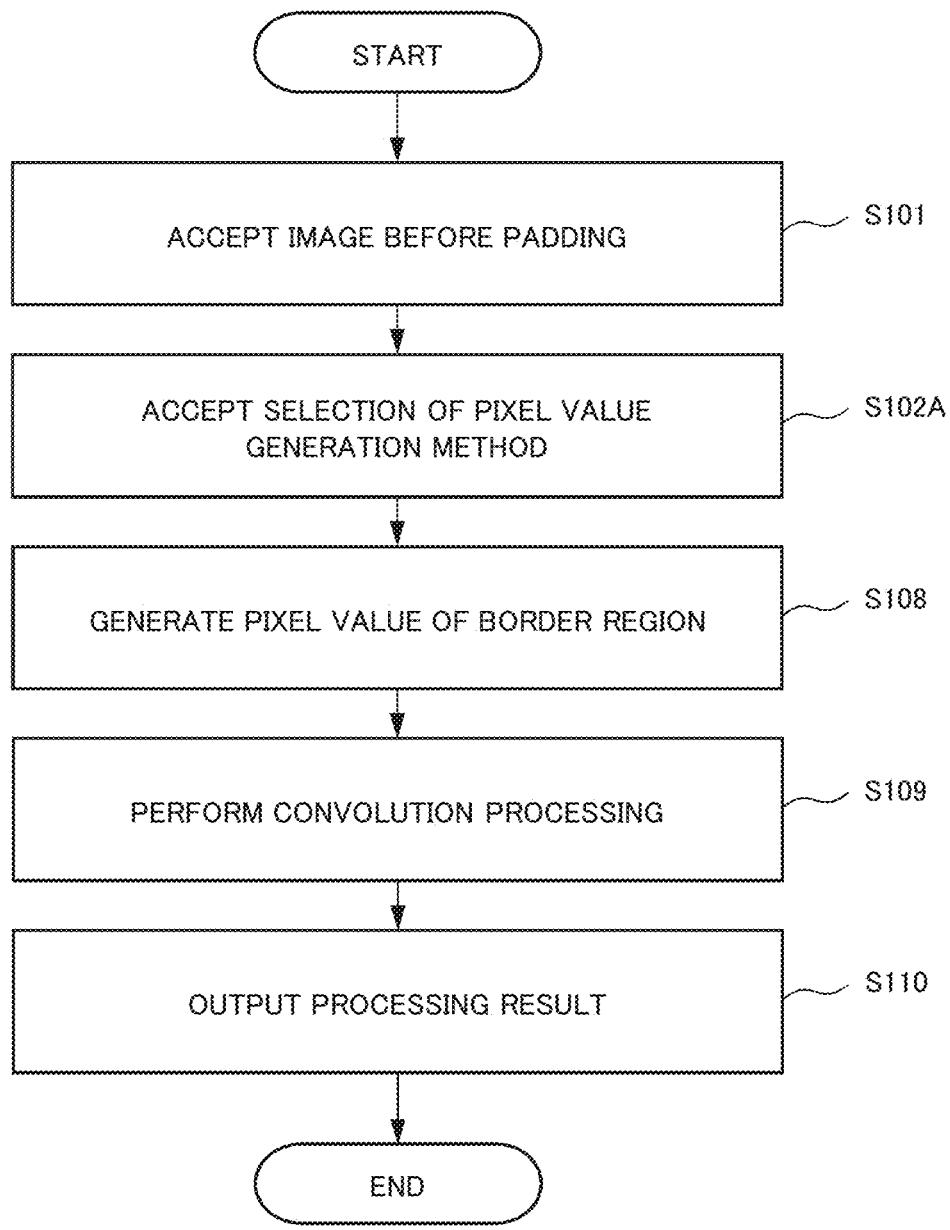
FIG. 22 is a flowchart exemplarily illustrating a flow of processing to be performed by the image recognition model generating device according to the third example embodiment.

FIG. 22 is a flowchart exemplarily illustrating a flow of processing to be performed by the image recognition model generating device 1000C according to the third example embodiment.

An image accepting unit 1010 accepts an image before padding 200 (S101). The selection accepting unit 1090 accepts a selection of a generation method of a pixel value for a border region from a user (S102A). The padding unit 1120C generates a pixel value that complements a border region included in an input image patch 201, based on the accepted generation method (S108). A convolution processing unit 1040 performs convolution processing for the image after padding including the pixel value generated by the padding unit 1120C (S109). A computation output unit 1050 outputs a processing result (S110).

<Operation and Advantageous Effect>

The image recognition model generating device 1000C according to the third example embodiment accepts the selection of the generation method of the pixel value for a border region from a user. The image recognition model generating device 1000C performs the selected generation method of the pixel value, and thus can perform the generation method of the pixel value according to needs of a user.

Therefore, the image recognition model generating device 1000C according to the third example embodiment can use the image complemented according to the needs of a user as an input image for learning of a convolutional neural network model.

The modification example according to the first example embodiment described above can be applied to the third example embodiment. The third example embodiment can be combined with the second example embodiment described above. In this case, for example, in the screen unit 500, the proposed method of the first example embodiment and the proposed method of the second example embodiment may be selectable.

Fourth Example Embodiment

An image generating device according to a fourth example embodiment can generate an image, by using a pixel value generated by a padding unit. A user can acquire a complemented image by generating the image by using the pixel value generated by the padding unit.

Figure 23:
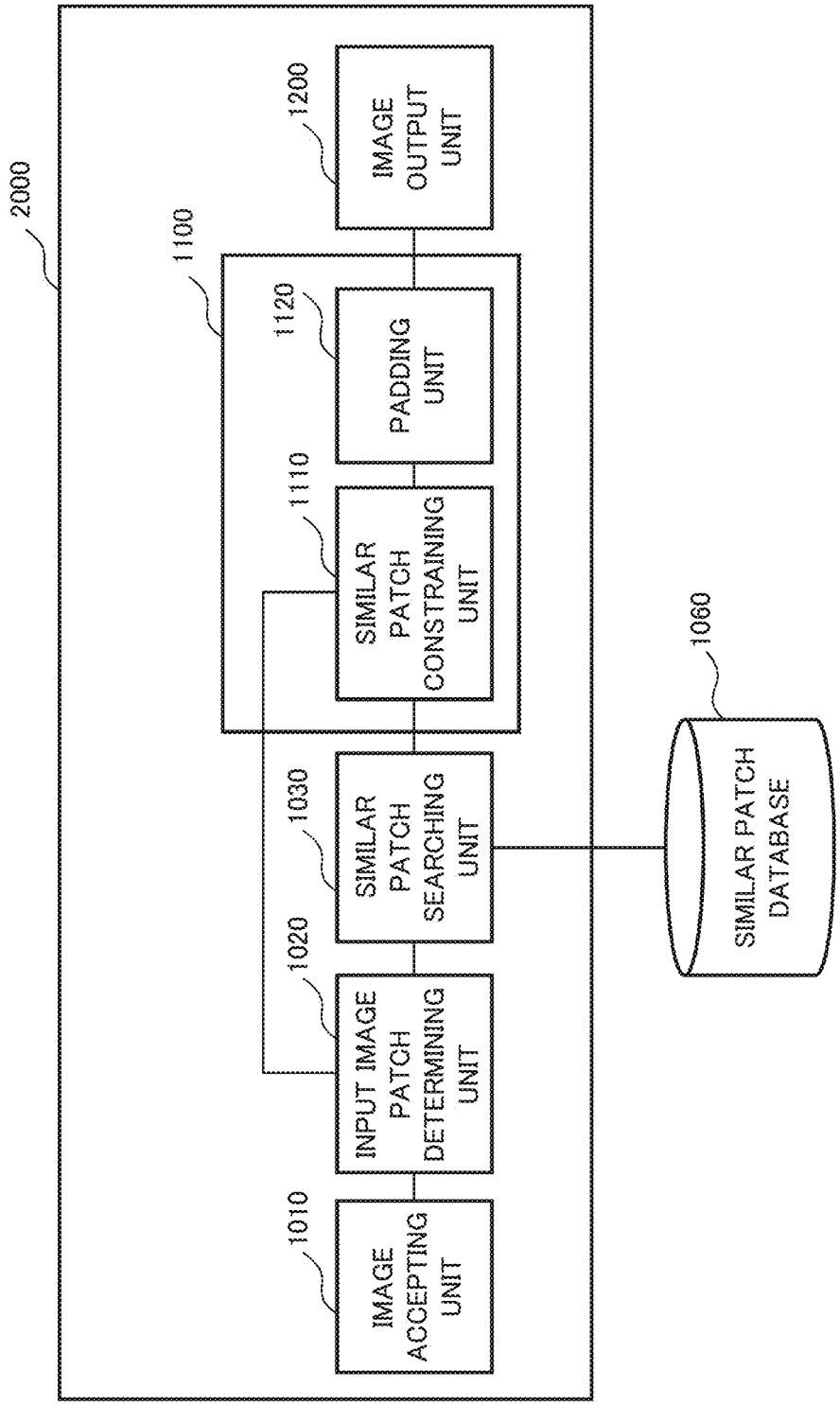
FIG. 23 is a block diagram illustrating a functional configuration of an image generating device according to a fourth example embodiment.

FIG. 23 is a block diagram illustrating a configuration of an image generating device 2000 according to the fourth example embodiment. The substantially same components as the components illustrated in FIG. 7 have the same reference signs, and thus overlapping description will be omitted. As illustrated in FIG. 23, the image generating device 2000 according to the fourth example embodiment includes an image output unit 1200.

<Device Configuration>

The image output unit 1200 accepts the generated pixel value from a padding unit 1120. Further, the image output unit 1200 accepts an image before padding 200 from an image accepting unit 1010. The image output unit 1200 generates an image after padding 300, $b_y$ using the generated pixel value and the image before padding 200.

<Flow of Processing>

Figure 24:
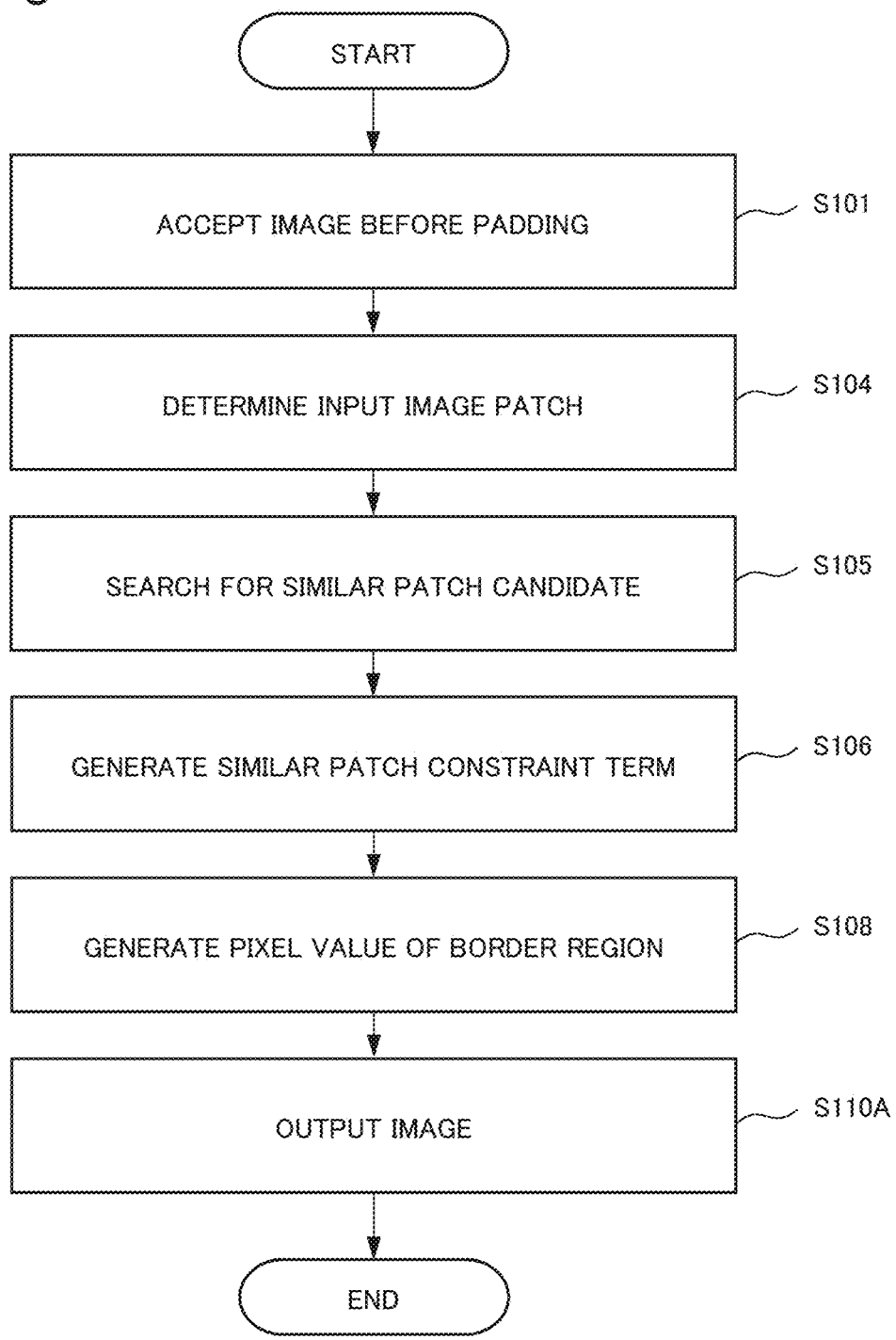
FIG. 24 is a flowchart exemplarily illustrating a flow of processing to be performed by an image recognition model generating device according to the fourth example embodiment.

FIG. 24 is a flowchart exemplarily illustrating a flow of processing to be performed by the image generating device 2000 according to the fourth example embodiment.

The image accepting unit 1010 accepts the image before padding 200 (S101). An input image patch determining unit 1020 determines an input image patch 201 from the image before padding 200 (S104). A similar patch searching unit 1030 searches for a similar patch that is similar to the input image patch 201 (S105). A similar patch constraining unit 1110 generates a similar patch constraint term, based on the similar patch (S106). The padding unit 1120 generates a pixel value that complements a border region included in the input image patch 201, based on the similar patch constraint term (S108). The image output unit 1200 outputs the image (S110A).

<Operation and Advantageous Effect>

The image generating device 2000 according to the fourth example embodiment can naturally complement the border region of the image before padding 200. The image generating device 2000 according to the fourth example embodiment can generate a natural image.

Fifth Example Embodiment

<Device Configuration>

Figure 25:
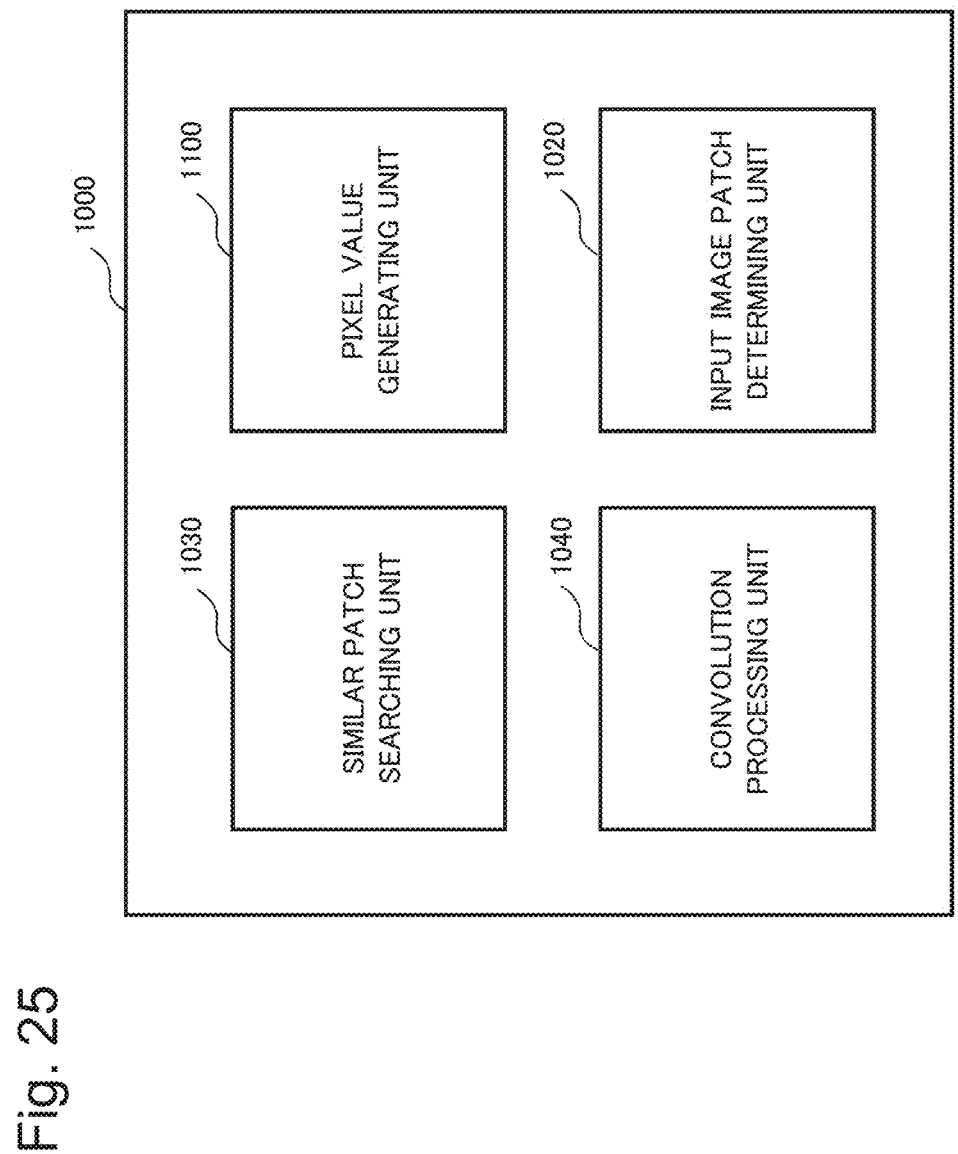
FIG. 25 is a block diagram illustrating a functional configuration of an image generating device according to a fifth example embodiment.

FIG. 25 is a functional block diagram of an image generating device according to a fifth example embodiment. An image recognition model generating device 1000 according to the fifth example embodiment includes an input image patch determining unit 1020, a pixel value generating unit 1100, a similar patch searching unit 1030, and a convolution processing unit 1040.

<Input Image Patch Determining Unit 1020>

The input image patch determining unit 1020 determines an input image patch including a border region of an input image with regard to an input image for learning of a convolutional neural network model that recognizes a predetermined target in an image.

<Similar Patch Searching Unit 1030>

The similar patch searching unit 1030 searches for a similar patch that is similar to the input image patch.

<Pixel Value Generation Unit 1100>

The pixel value generating unit 1100 generates a pixel value that complements a border region included in the input image patch, based on the similar patch.

<Convolution Processing Unit 1040>

The convolution processing unit 1040 performs convolution processing for an image including the generated pixel value and a pixel value of the input image.

Sixth Example Embodiment

<Device Configuration>

Figure 26:
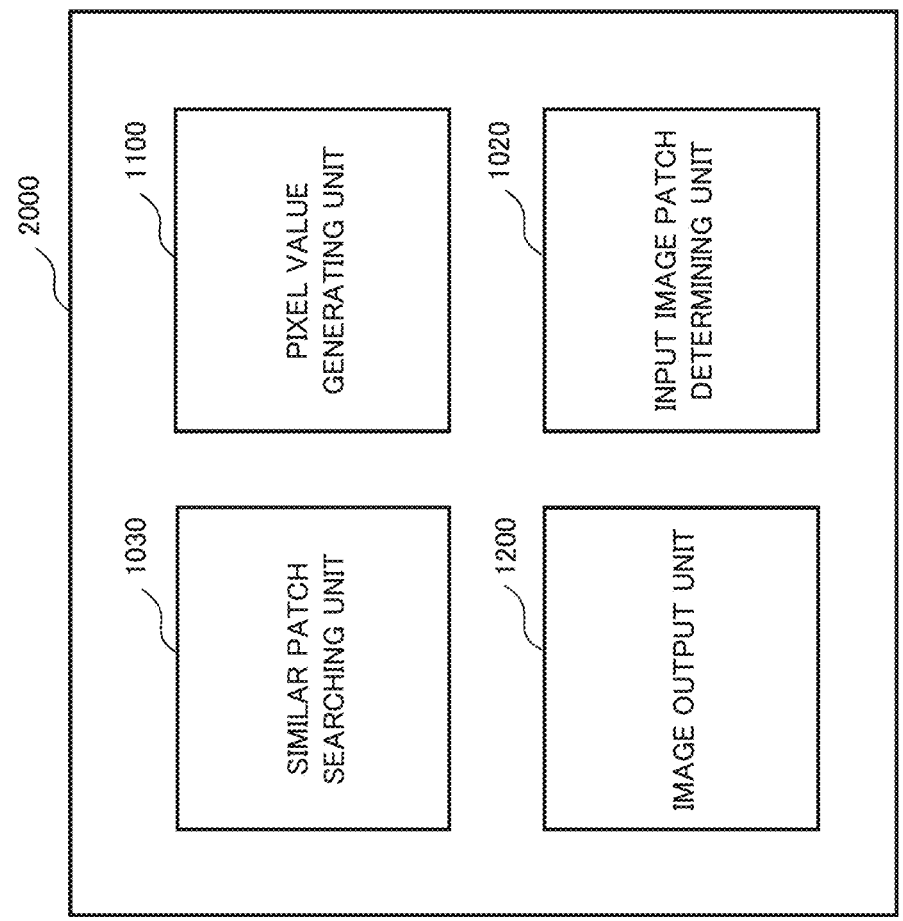
FIG. 26 is a block diagram illustrating a functional configuration of an image generating device according to a sixth example embodiment.

FIG. 26 is a functional block diagram of an image generating device according to a sixth example embodiment. An image generating device 2000 according to the sixth example embodiment includes an input image patch determining unit 1020, a pixel value generating unit 1100, a similar patch searching unit 1030, and an image output unit 1200.

<Input Image Patch Determining Unit 1020>

The input image patch determining unit 1020 determines an input image patch including a border region of an input image with regard to an input image for generating a convolutional neural network that recognizes a predetermined target in an image.

<Similar Patch Searching Unit 1030>

The similar patch searching unit 1030 searches for a similar patch that is similar to the input image patch.

<Pixel Value Generating Unit 1100>

The pixel value generating unit 1100 generates a pixel value that complements a border region included in the input image patch, based on the similar patch.

<Image Output Unit 1200>

The image output unit 1200 generates the image in which the pixel value of the border region of the input image is complemented from the generated pixel value of the border region and the pixel value of the input image, and outputs the generated image.

The above-described example embodiments and specific examples can be appropriately combined and implemented.

The block division illustrated in each block diagram is a configuration represented for convenience of description. The present invention described by using each example embodiment as an example is not limited to the configuration illustrated in each block diagram at a time of implementation.

Further, the reference signs in the drawings described above are provided, for convenience of description, for each element as an example to facilitate understanding, and are not intended to limit the present invention to the illustrated example embodiments.

The example embodiments for implementing the present invention have been described above, however the above example embodiments are for facilitating the understanding of the present invention, and are not for limiting the interpretation of the present invention. The present invention can be modified and improved without departing from the spirit thereof, and the present invention also includes an equivalent thereof.

A part or the whole of the above-described example embodiments may also be described as in supplementary notes below, which is not limited thereto.

(Supplementary Note 1)

An image recognition model generating device including:

an input image patch determining unit for determining, based on an input image for generating a convolutional neural network that recognizes a predetermined target in an image, an input image patch containing a border region adjacent to an outside of a boundary line of the input image;

a similar patch searching unit for searching for a similar patch being similar to the input image patch;

a pixel value generating unit for generating, based on the similar patch, a pixel value that complements the border region; and a convolution processing unit for performing convolution processing from a generated pixel value and a pixel value of the input image.

(Supplementary Note 2)

The image recognition model generating device according to supplementary note 1, further including an accepting unit for accepting a statistical law to be followed by the input image, wherein the pixel value generating unit generates, based on the similar patch and the statistical law, a pixel value that complements the border region.

(Supplementary Note 3)

The image recognition model generating device according to supplementary note 1 or 2, further including a parameter accepting unit for accepting a parameter, wherein the pixel value generating unit generates a pixel value, based on an evaluation function that includes a first constraint that restricts, based on the statistical law, a pixel value to be generated, a second constraint that restricts, based on the similar patch, a pixel value to be generated, and the parameter, and the parameter is used as a weight of the second constraint for the first constraint in the evaluation function.

(Supplementary Note 4)

The image recognition model generating device according to any one of supplementary notes 1 to 3, wherein the similar patch searching unit searches for the similar patch from the input image.

(Supplementary Note 5)

The image recognition model generating device according to any one of supplementary notes 1 to 3, wherein the similar patch searching unit searches for the similar patch from a plurality of patch candidates generated based on a different image from the input image.

(Supplementary Note 6)

The image recognition model generating device according to any one of supplementary notes 1 to 5, further including a selection accepting unit for accepting information on a selection of any complementation method among a plurality of complementation methods, wherein the pixel value generating unit generates a pixel value that complements the border region by a selected complementation method, and the plurality of complementation methods include at least a method of complementing the border region, based on the similar patch, and a method of complementing the border region by one predetermined pixel value.

(Supplementary Note 7)

An image recognition model generating method performed by a computer, including:

determining, based on an input image for generating a convolutional neural network that recognizes a predetermined target in an image, an input image patch containing a border region adjacent to an outside of a boundary line of the input image, and searching for a similar patch being similar to the input image patch;

generating, based on the similar patch, a pixel value that complements the border region; and performing convolution processing from a generated pixel value of the border region and a pixel value of the input image.

(Supplementary Note 8)

The image recognition model generating method according to supplementary note 7 performed by a computer, further including:

accepting a statistical law to be followed by the input image, and complementing, when generating the pixel value, the border region, based on the similar patch and the statistical law.

(Supplementary Note 9)

A program storing medium storing a computer program that causes a computer to execute, processing of determining, based on an input image for generating a convolutional neural network that recognizes a predetermined target in an image, an input image patch containing a border region adjacent to an outside of a boundary line of the input image, and searching for a similar patch being similar to the input image patch, processing of generating, based on the similar patch, a pixel value that complements the border region, and processing of performing convolution processing from a generated pixel value of the border region and a pixel value of the input image.

(Supplementary Note 10)

The image recognition model generating program storing medium according to supplementary note 9, storing a computer program that causes the computer to further execute, processing of accepting a statistical law to be followed by the input image, and processing of generating, when generating the pixel value, a pixel value by complementing the border region, based on the similar patch and the statistical law.

(Supplementary Note 11)

An image generating device including:

a similar patch searching unit for searching for a similar patch being similar to an input image patch containing a border region adjacent to an outside of an input image;

a pixel value generating unit for generating, based on the similar patch, a pixel value that complements the border region; and an image output unit for generating an image in which a pixel value of the border region is complemented from a generated pixel value of the border region and a pixel value of the input image, and outputting the image.

(Supplementary Note 12)

The image generating device according to supplementary note 11, wherein the pixel value generating unit generates a pixel value that complements the border region from a statistical law to be followed by the input image.

(Supplementary Note 13)

An image generating method performed by a computer, including:

determining an input image patch containing a border region adjacent to an outside of a boundary line of an input image, and searching for a similar patch being similar to the input image patch;

generating, based on the similar patch, a pixel value that complements the border region; and outputting an image in which a pixel value of the border region is complemented from a generated pixel value of the border region and a pixel value of the input image.

(Supplementary Note 14)

An image generating program storing medium storing a computer program that causes a computer to execute:

processing of determining an input image patch containing a border region adjacent to an outside of a boundary line of an input image, and searching for a similar patch being similar to the input image patch;

processing of generating, based on the similar patch, a pixel value that complements the border region included in the input image patch; and processing of outputting an image in which a pixel value of the border region of the input image is complemented from a generated pixel value of the border region and a pixel value of the input image.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-233935, filed on Dec. 6, 2017, the disclosure of which is incorporated herein in its entirety by reference.

REFERENCE SIGNS LIST 1000A, 1000B, 1000C Image recognition model generating device
1010 Image accepting unit
1020 Input image patch determining unit
1030 Similar patch searching unit
1040 Convolution processing unit
1050 Computation output unit
1060 Similar patch database
1070 Statistical law accepting unit
1080 Parameter accepting unit
1090 Selection accepting unit
1100 Pixel value generating unit
1100B Pixel value generating unit
1100C Pixel value generating unit
1110 Similar patch constraining unit
1120, 1120B, 1120C Padding unit
1130 Input model constraining unit
1200 Image output unit
2000 Image generating device
3000 Calculator

The invention claimed is:

1. An image recognition model generating device comprising:
at least one memory storing instructions; and
at least one processor configured to access the at least one memory and execute the instructions to:
generate, based on an input image for generating a convolutional neural network that recognizes a predetermined target in an image, an input image patch containing a border region adjacent to an outside of a boundary line of the input image,
search for a similar patch being similar to the input image patch,
generate, based on the similar patch, a pixel value that complements the border region, and
perform convolution processing operations using the generated pixel value and a pixel value of the input image.

2. The image recognition model generating device according to claim 1, wherein
the at least one processor is further configured to execute the instructions to:
accept a statistical law to be followed by the input image, and
generate, based on the similar patch and the statistical law, a pixel value that complements the border region.

3. The image recognition model generating device according to claim 1, wherein
the at least one processor is further configured to execute the instructions to:
accept a parameter, and
generate a pixel value, based on an evaluation function that includes a first constraint that restricts, based on a statistical law, a pixel value to be generated, a second constraint that restricts, based on the similar patch, a pixel value to be generated, and the parameter, wherein
the parameter is used as a weight of the second constraint for the first constraint in the evaluation function.

4. The image recognition model generating device according to claim 1, wherein
the at least one processor is further configured to execute the instructions to:
search for the similar patch from the input image.

5. The image recognition model generating device according to claim 1, wherein
the at least one processor is further configured to execute the instructions to:
search for the similar patch from a plurality of patch candidates generated based on a different image from the input image.

6. The image recognition model generating device according to claim 1, wherein
the at least one processor is further configured to execute the instructions to:
accept information on a selection of any complementation method among a plurality of complementation methods, and
generate a pixel value that complements the border region by a selected complementation method, wherein
the plurality of complementation methods include at least
a method of complementing the border region, based on the similar patch, and
a method of complementing the border region by one predetermined pixel value.

7. An image recognition model generating method performed by a computer, comprising:
determining, based on an input image for generating a convolutional neural network that recognizes a predetermined target in an image, an input image patch containing a border region adjacent to an outside of a boundary line of the input image, and searching for a similar patch being similar to the input image patch;
generating, based on the similar patch, a pixel value that complements the border region; and
performing convolution processing operations using the generated pixel value of the border region and a pixel value of the input image.

8. The image recognition model generating method according to claim 7 performed by a computer, further comprising:
accepting a statistical law to be followed by the input image, and
complementing, when generating the pixel value, the border region, based on the similar patch and the statistical law.

9. The image recognition model generating method according to claim 7 performed by a computer, further comprising:
accepting a parameter, wherein
the pixel value generating means generates a pixel value, based on an evaluation function that includes a first constraint that restricts, based on a statistical law, a pixel value to be generated, a second constraint that restricts, based on the similar patch, a pixel value to be generated, and the parameter, and
the parameter is used as a weight of the second constraint for the first constraint in the evaluation function.

10. The image recognition model generating method according to claim 7 performed by a computer, further comprising:
searching for the similar patch from the input image.

11. The image recognition model generating method according to claim 7 performed by a computer, further comprising:
searching for the similar patch from a plurality of patch candidates generated based on a different image from the input image.

12. The image recognition model generating method according to claim 7 performed by a computer, further comprising:

accepting information on a selection of any complementation method among a plurality of complementation methods, and generating a pixel value that complements the border region by a selected complementation method, wherein the plurality of complementation methods include at least a method of complementing the border region, based on the similar patch, and a method of complementing the border region by one predetermined pixel value.

13. A non-transitory computer-readable program storing medium storing a computer program for causing a computer to execute:

processing of determining, based on an input image for generating a convolutional neural network that recognizes a predetermined target in an image, an input image patch containing a border region adjacent to an outside of a boundary line of the input image, and searching for a similar patch being similar to the input image patch;

processing of generating, based on the similar patch, a pixel value that complements the border region; and processing of performing convolution processing operations using the generated pixel value of the border region and a pixel value of the input image.

14. The non-transitory computer-readable program storing medium according to claim 13, storing a computer program for causing the computer to further execute, processing of accepting a statistical law to be followed by the input image, and processing of generating, when generating the pixel value, a pixel value that complements the border region, based on the similar patch and the statistical law.

* * * * *